United States Patent
Choi et al.

(10) Patent No.: US 12,413,534 B2
(45) Date of Patent: Sep. 9, 2025

(54) APPARATUS AND METHOD FOR GUARANTEEING DETERMINISTIC LATENCY IN COMMUNICATION SYSTEM

(71) Applicant: ELECTRONICS AND TELECOMMUNICATIONS RESEARCH INSTITUTE, Daejeon (KR)

(72) Inventors: Chang-Ho Choi, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/647,816

(22) Filed: Apr. 26, 2024

(65) Prior Publication Data
US 2024/0372817 A1    Nov. 7, 2024

(30) Foreign Application Priority Data
May 4, 2023    (KR) .................... 10-2023-0058348

(51) Int. Cl.
*H04L 47/56*    (2022.01)
*H04L 49/00*    (2022.01)

(52) U.S. Cl.
CPC .......... *H04L 47/56* (2013.01); *H04L 49/3018* (2013.01)

(58) Field of Classification Search
CPC .............. H04L 47/56–568; H04L 47/62–6235
See application file for complete search history.

(56) References Cited

U.S. PATENT DOCUMENTS

| | | | |
|---|---|---|---|
| 11,362,959 B2 | 6/2022 | Eckert et al. | |
| 2010/0157963 A1 | 6/2010 | Choi et al. | |
| 2021/0014168 A1 | 1/2021 | Geng et al. | |
| 2022/0303083 A1 | 9/2022 | Choi et al. | |
| 2024/0031302 A1* | 1/2024 | Francini | H04L 47/283 |
| 2024/0250913 A1* | 7/2024 | Guo | H04L 47/28 |
| 2024/0323136 A1* | 9/2024 | Guo | H04L 47/6215 |

OTHER PUBLICATIONS

Mick Seaman, "Paternoster policing and scheduling," IEEE802.1, May 23, 2019.

* cited by examiner

*Primary Examiner* — Pao Sinkantarakorn

(57) ABSTRACT

An apparatus and method for guaranteeing deterministic latency in a communication system is proposed. The method of operating enqueue packet processing may include extracting cycle information of a received packet from the received packet, identifying at least one of enq_myQ, enq_mateQ, and enq_mateQ_hold states of a queuing state parameter of an enqueue process for a previous packet for each flow at a reception node, identifying whether a cycle parameter for performing a CQF operation for the previous packet for each flow in the reception node is the same as a cycle parameter for performing the current CQF operation, identifying whether a cycle parameter included in the previously received packet for each flow in the reception node is the same as a cycle parameter included in a currently received packet, and storing (enqueuing) the received packet on the basis of the identifying processes and storing information about the received packet.

18 Claims, 12 Drawing Sheets

| Flow ID | rx_cycle | internal_cycle | internal_enq_state |
|---|---|---|---|
| 1 | even/odd | even/odd | enq_myQ/enq_mateQ/enq_mateQ_hold |
| 2 | even/odd | even/odd | enq_myQ/enq_mateQ/enq_mateQ_hold |
| 3 | even/odd | even/odd | enq_myQ/enq_mateQ/enq_mateQ_hold |
| 4 | even/odd | even/odd | enq_myQ/enq_mateQ/enq_mateQ_hold |
| ⋮ | ⋮ | ⋮ | ⋮ |

(a) VLAN Tagged Packet (b) MPLS Packet (c) IP Packet

APPARATUS AND METHOD FOR GUARANTEEING DETERMINISTIC LATENCY IN COMMUNICATION SYSTEM

CROSS REFERENCE TO RELATED APPLICATION

The present application claims priority to Korean Patent Application No. 10-2023-0058348, filed May 4, 2023, the entire contents of which are incorporated herein for all purposes by this reference.

BACKGROUND OF THE INVENTION

Field of the Invention

The present disclosure relates generally to a communication system and, more particularly, to an apparatus and method for guaranteeing deterministic latency in a communication system.

Description of the Related Art

The present disclosure relates to a method of transmitting time-sensitive data in a packet network. The packet network is a network for transmitting data by dividing the data into small packets, and is used in various fields such as the Internet, mobile communications, and industrial control. The time-sensitive data is data requiring characteristics of real-time or accuracy, and for example, is voice, images, control, etc. In order to transmit such data, deterministic latency in which packet transmission delay time is predictable and maintained within a predetermined range should be guaranteed.

The standardized cyclic queuing and forwarding (CQF) method is a method of sequentially transmitting packets at fixed time intervals called cycle times, and when the number of nodes on a path is N and a cycle time per node is T, the maximum end-to-end delay may be determined as $(N+1) \times T$.

However, this method has a problem that precise time synchronization is required between nodes and a malfunction may occur in a case where transmission delay of a link between nodes is large or variable.

SUMMARY OF THE INVENTION

Based on the discussion described above, the present disclosure provides an apparatus and method for guaranteeing deterministic latency in a communication system.

In addition, the present disclosure provides an apparatus and method for guaranteeing deterministic latency even in an asynchronous environment where time synchronization is not required.

In addition, the present disclosure provides an apparatus and method for guaranteeing deterministic latency even in a case where transmission delay of a link between nodes is large or variable. In addition, the present disclosure provides an apparatus and method, wherein at least three or more queues are not required for implementation and a transmission node is not required to transmit additional packet information.

According to various exemplary embodiments of the present disclosure, there may be included a method of operating enqueue packet processing in a communication system, the method including: a process of extracting cycle information of a received packet from the received packet; a process of identifying at least one of whether a queuing state parameter prev_internal_enq_state of an enqueue process for a previous packet for each flow at a reception node indicates a state enq_myQ of the received packet stored in a queue currently performing reception, whether the queuing state parameter prev_internal_enq_state of the enqueue process for the previous packet for each flow indicates a state enq_mateQ of the received packet stored in a queue currently performing transmission, or whether the queuing state parameter prev_internal_enq_state of the enqueue process for the previous packet for each flow indicates a state enq_mateQ_hold of which the received packet is stored in the queue currently performing the transmission and the transmission of the corresponding packet is set to be held in a corresponding cycle; a process of identifying whether a cycle parameter prev_internal_cycle for performing a CQF operation for the previous packet for each flow in the reception node is the same as a cycle parameter internal_cycle for performing the current CQF operation; a process of identifying whether a cycle parameter prev_rx_cycle included in the previously received packet for each flow in the reception node is the same as a cycle parameter rx_cycle included in a currently received packet; and a process of storing (enqueuing) the received packet on the basis of the identifying processes and storing information about the received packet in an enqueue state table for each flow.

According to various exemplary embodiments of the present disclosure, there is provided an apparatus for enqueue packet processing in a communication system, the apparatus including: an input port; and a cyclic queuing and forwarding (CQF) processing block operably connected to the input port, wherein the CQF processing block may extract cycle information of a received packet from the received packet, identify at least one of whether a queuing state parameter prev_internal_enq_state of an enqueue process for a previous packet for each flow at a reception node indicates a state enq_myQ of the received packet stored in a queue currently performing reception, whether the queuing state parameter prev_internal_enq_state of the enqueue process for the previous packet for each flow indicates a state enq_mateQ of the received packet stored in a queue currently performing transmission, or whether the queuing state parameter prev_internal_enq_state of the enqueue process for the previous packet for each flow indicates a state enq_mateQ_hold of which the received packet is stored in the queue currently performing the transmission and the transmission of the corresponding packet is set to be held in a corresponding cycle, identify whether a cycle parameter prev_internal_cycle for performing a CQF operation for the previous packet for each flow in the reception node is the same as a cycle parameter internal_cycle for performing the current CQF operation, identify whether a cycle parameter prev_rx_cycle included in the previously received packet for each flow in the reception node is the same as a cycle parameter rx_cycle included in a currently received packet, and store (enqueue) the received packet on the basis of the identifying processes and storing information about the received packet in an enqueue state table for each flow.

According to various exemplary embodiments of the present disclosure, there is provided a method of operating dequeue packet processing in a communication system, the method including: a process of identifying a state of a transmission queue and whether a packet is stored in the transmission queue or not, a process of identifying a signal for distinguishing a cycle new_internal_cycle during a CQF operation is performed on a new packet, a process of identifying a signal ignore_hold set to ignore a signal hold set to hold outputting a specific packet, a process of identifying the signal hold set to hold the outputting of the specific packet, the signal being stored for each packet, a process of setting the signal ignore_hold so as to ignore the signal hold set to hold the outputting of the specific packet, and a process of outputting (dequeuing) the packet on the basis of the identifying processes to set a cycle parameter internal_cycle for performing the CQF operation for the packet for each output packet.

According to various exemplary embodiments of the present disclosure, there is provided an apparatus for dequeue packet processing in a communication system, including: an input port; and a cyclic queuing and forwarding (CQF) processing block operably connected to the input port, wherein the CQF processing block may identify a state of a transmission queue and whether a packet is stored in the transmission queue or not, identify a signal for distinguishing a cycle new_internal_cycle during a CQF operation is performed on a new packet, identify a signal ignore_hold set to ignore a signal hold set to hold outputting a specific packet, identify the signal hold set to hold the outputting of the specific packet, the signal being stored for each packet, set the signal ignore_hold so as to ignore the signal hold set to hold the outputting of the specific packet, and output (dequeue) the packet on the basis of the identifying processes to set a cycle parameter internal_cycle for performing the CQF operation for the packet for each output packet.

The apparatus and method according to various exemplary embodiments of the present disclosure solves problems and limitations of the cyclic queuing and forwarding (CQF) method defined in the standard when time-sensitive data is transmitted in a packet network, whereby deterministic latency may be guaranteed.

In addition, the apparatus and method according to various exemplary embodiments of the present disclosure may guarantee deterministic latency even in an asynchronous environment where time synchronization is not required.

In addition, the apparatus and method according to various exemplary embodiments of the present disclosure may guarantee deterministic latency even when transmission delay of a link between nodes is large or variable.

In addition, the apparatus and method according to various exemplary embodiments of the present disclosure ensures that at least three or more queues are not required for implementation and a transmission node is not required to transmit additional packet information.

The effects of the present disclosure are not limited to the above-mentioned effects, and other different effects that are not mentioned will be clearly understood by those skilled in the art from the following description.

DETAILED DESCRIPTION OF THE INVENTION

Figure 1:
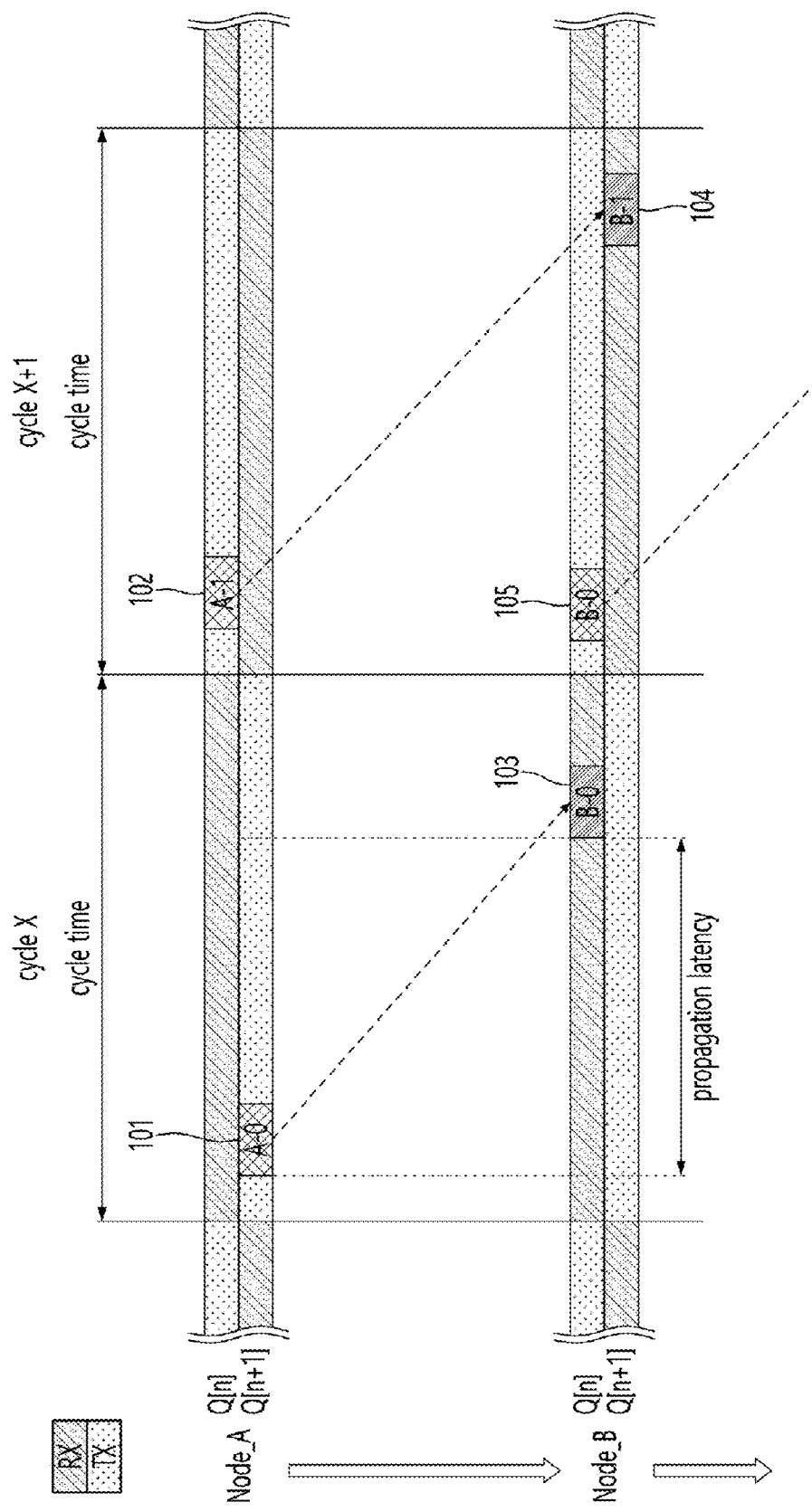
FIG. 1 is a view illustrating an example of a timing diagram for describing an operation of a conventional cyclic queuing and forwarding (CQF) method according to various exemplary embodiments of the present disclosure.

The terms used in the present disclosure are only used to describe specific exemplary embodiments, and may not be intended to limit the scope of other exemplary embodiments. As used herein, the singular forms may include the plural forms as well, unless the context clearly indicates otherwise. The terms including technical and scientific terms used herein have the same meaning as commonly understood by those skilled in the art described in the present disclosure. Among the terms used in the present disclosure, terms defined in a general dictionary may be interpreted as having the same or similar meaning as the meaning in the context of the related art, and are not interpreted in an ideal or excessively formal meaning unless explicitly defined in the present disclosure. In some cases, even the terms defined in the present disclosure may not be interpreted to exclude the exemplary embodiments of the present disclosure.

In various exemplary embodiments of the present disclosure described below, a hardware-based approach method is described as an example. However, since the various exemplary embodiments of the present disclosure include technology using both hardware and software, the various exemplary embodiments of the present disclosure do not exclude a software-based approach method.

Hereinafter, the present disclosure relates to an apparatus and method for guaranteeing deterministic latency in a communication system. Specifically, the present disclosure describes a technology for solving problems and limitations of the cyclic queuing and forwarding (CQF) method defined in the standard when time-sensitive data is transmitted in a packet network, so that deterministic latency may be guaranteed.

That is, the present disclosure is for a method for transmitting time-sensitive data in a packet network, and relates technology for solving the problems and limitations of the cyclic queuing and forwarding (CQF) method defined in the standard, so as to guarantee deterministic latency even in an asynchronous environment where time synchronization is not required and in a wide-area network where transmission delay in a link between nodes is large.

The cyclic queuing and forwarding method is a technology that has been standardized in the IEEE802.1Q time sensitive networking (TSN) task group (TG) in order to guarantee deterministic latency for time-sensitive data. When the number of nodes is N and a cycle time per node is T, the maximum end-to-end delay may be determined as (N+1)×T, thereby providing the deterministic latency on a path.

In the operation method of the cyclic queuing and forwarding (CQF), when it is assumed that there are Node A, Node B, and Node C on a transmission path in a packet network, and that a next hop of Node A is Node B and a next hop of Node B is Node C, a packet is transmitted within a cycle time of Node A and the transmitted packet is received within the same cycle time by the next Node B. The packet received by Node B is transmitted to Node C within a next cycle time of Node B. Accordingly, the maximum delay time of one node may be specified by a cycle time which is set for a corresponding node. Such an operation method requires precise time synchronization for all nodes on the path. The cycle time determines the start and end time points so that all the nodes on the path are synchronized to the same time information. Each node sets a size of a queue to store packets so that packet reception and transmission may proceed smoothly within each cycle time. The conventional circular queuing and forwarding method requires the precise time synchronization for the packet transmission and reception between nodes, and when the time synchronization is not preceded, there is a problem in that a malfunction occurs due to a difference in cycle times between the nodes.

It is more difficult to implement such high-precision time synchronization in a larger wide area network (or a large scale network) than a relatively small local area network (LAN) area. In addition, in a case where transmission delay of a link between nodes exceeds a cycle time of a corresponding node due to a long distance between the nodes, or in a case where transmission delay deviation of the link exceeds predicted transmission delay of the link, there is a problem in that a packet transmitted from Node A may not be received by Node B within the same cycle time. In order to solve such a problem, a method of using two or more packet queues has been proposed, but this method has a disadvantage of requiring at least three or more queues for implementation and has a problem such that a transmission node has to additionally transmit cycle information of a corresponding packet.

The objective of the present disclosure is for a method for transmitting time-sensitive data in a packet network, and is to provide a circular queuing and forwarding packet transmission method that solves the problems and limitations of the cyclic queuing and forwarding (CQF) method defined in the standard, so as to guarantee deterministic latency even in an asynchronous environment where time synchronization is not required and in a wide-area network where transmission delay in a link between nodes is large.

In the following description, terms referring to signals, terms referring to channels, terms referring to control information, terms referring to network entities, terms referring to components of a device, and the like are illustrated for convenience of the description. Accordingly, the present disclosure is not limited to the terms described below, but other terms having equivalent technical meanings may be used.

In addition, the present disclosure describes various exemplary embodiments by using terms used in some communication standards (e.g., 3rd Generation Partnership Project, 3GPP), but this is only an example for description. Various exemplary embodiments of the present disclosure may be easily modified and applied to other communication systems.

FIG. 1 is a view illustrating an example of a timing diagram for describing an operation of a conventional cyclic queuing and forwarding (CQF) method according to various exemplary embodiments of the present disclosure.

Referring to FIG. 1, the CQF method requires precise time synchronization between nodes Node_A and Node_B on a transmission path, and transmission delay (i.e., propagation latency) of the path between the nodes has to meet a requirement of being less than a cycle time cycle_time.

Referring to FIG. 1, as an example of a case where packets are transmitted from Node_A and received by Node_B, each node Node_A and Node_B has two queues Q[n] and Q[n+1] for a CQF operation, and during cycle X, Q[n] of each node may perform packet reception.

In contrast, Q[n+1] performs packet transmission. During cycle X+1, which is the next cycle, in addition that Q[n] of each node performs packet transmission, each Q[n+1] performs packet reception, so that while cycles progress, the packet reception and packet transmission may be repeated alternately.

More specifically, in Q[n+1] of Node_A, a packet A-0 101 to be transmitted within cycle X may be stored, and in Q[n], a packet A-1 102 to be transmitted within cycle X+1 may be stored. The packets 101 and 102 are packets set to belong to the same flow, but for convenience of description, it may be assumed that only packets set to belong to a single flow are transmitted. The packet A-0 101 transmitted from Q[n+1] of Node_A in cycle X may be received, as B-0 103, by Q[n] of Node_B in the same cycle X, and a packet 105 may be transmitted to the next node (not shown) in cycle X+1, which is the next cycle.

In the same manner, a packet A-1 102 transmitted from Q[n] of Node_A in cycle X+1 is received, as B-1 104, by Q[n+1] of Node_B in the same cycle, i.e., cycle X+1, and a packet (not shown) may be transmitted to a next node (not shown) in cycle X+2 (not shown), that is, the next cycle.

By repeatedly performing the above-described operation, when the number of nodes on a path is N and a cycle time of each node is T, the CQF method may clearly determine that the maximum latency is (N+1)×T, the minimum latency is (N−1)×T, and deviation (i.e., jitter or latency variation) is within 2T.

Figure 2A:
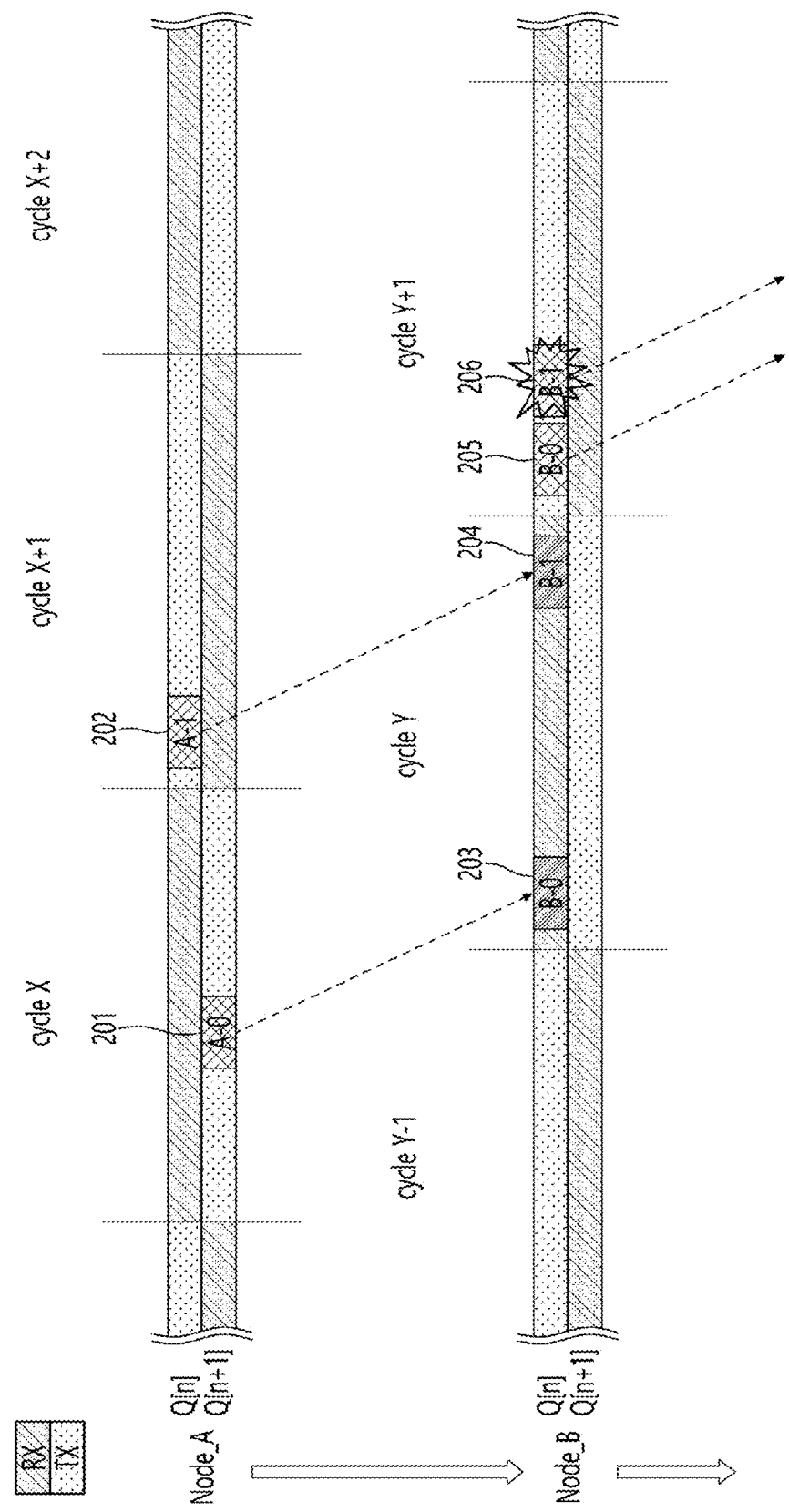
FIG. 2A is a view illustrating an example of a timing diagram for describing a malfunction occurred when time synchronization does not match during a CQF operation according to various exemplary embodiments of the present disclosure.

FIG. 2A is a view illustrating an example of a timing diagram for describing a malfunction occurred when time synchronization does not match during a CQF operation according to various exemplary embodiments of the present disclosure. Specifically, FIG. 2 illustrates a case where time synchronization does not match during the CQF operation described in FIG. 1.

Referring to FIG. 2A, unlike the description in FIG. 1, since time synchronization between two nodes Node_A and Node_B does not match, there may occur a problem in that packets received in cycles different from each other at Node_B are consecutively transmitted in one cycle.

More specifically, in Q[n+1] of Node_A, a packet A-0 201 to be transmitted within cycle X may be stored, and in Q[n], a packet A-1 202 to be transmitted within cycle X+1 may be stored. The packets 201 and 202 are packets set to belong to the same flow, but for convenience of description, it may be assumed that only packets set to belong to a single flow are transmitted. It is assumed that a configuration of two nodes is the same as the description shown in FIG. 1, and cycles of Node_A are cycle X, cycle X+1, and cycle X+2 and cycles of Node_B are cycle Y−1, cycle Y, and cycle Y+1. Due to mismatch of time synchronization, a packet A-0 201 transmitted from Q[n+1] of Node_A in cycle X may be received as B-0 203 by Q[n] of Node_B in cycle Y and a packet 205 may be transmitted to the next node (not shown) in cycle Y+1, which is the next cycle.

In the same manner, unlike that case shown in FIG. 1, a packet A-1 202 transmitted from Q[n] of Node_A in cycle X+1 is not received by Q[n+1] of Node_B in cycle Y+1 due to mismatch of time synchronization, but is received as B-1 204 by Q[n] of Node_B in cycle Y. Because of this reason, a packet 206 is transmitted to the next node (not shown) in cycle Y+1, which is the next cycle, whereby the packets B-0 203 and B-1 204 received by Node_B in Node_A's different cycles, i.e., in the cycle X and cycle X+1 may cause a malfunction in which packets 205 and 206 are consecutively transmitted in the same cycle Y+1.

Figure 2B:
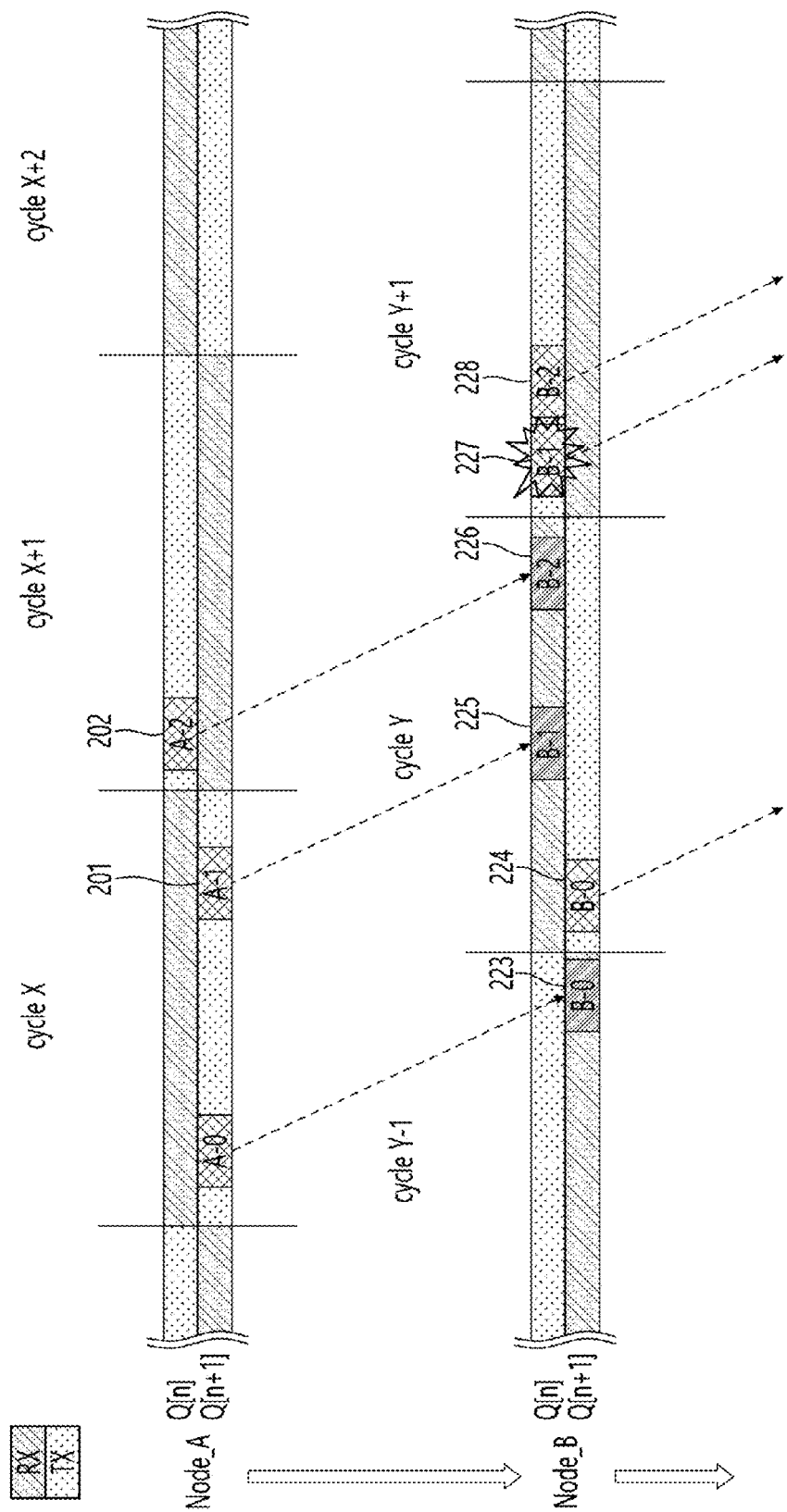
FIG. 2B is a view illustrating another example of a timing diagram for describing a malfunction occurred when time synchronization does not match during a CQF operation according to various exemplary embodiments of the present disclosure.

FIG. 2B is a view illustrating another example of a timing diagram for describing a malfunction occurred when time synchronization does not match during a CQF operation according to various exemplary embodiments of the present disclosure.

Referring to FIG. 2B, unlike the description as shown in FIG. 1, due to the mismatched time synchronization between the two nodes Node_A and Node_B, there may occur a problem in that packets transmitted from Node_A in the same cycle are received by Node_B in cycles different from each other, and thus the cycle at a time when transmission is performed from Node_B is changed.

Specifically, in Q[n+1] of Node_A, packets A-0 220 and A-1 221 to be transmitted within cycle X may be stored, and in Q[n], a packet A-2 222 to be transmitted within cycle X+1 may be stored. The packets 220 to 222 are packets set to belong to the same flow, but for convenience of description, it may be assumed that only packets set to belong to a single flow are transmitted. It is assumed that a configuration of two nodes is the same as that description shown in FIG. 1 and cycles of Node_A are cycle X, cycle X+1, and cycle X+2 and cycles of Node_B are cycle Y−1, cycle Y, and cycle Y+1. Due to mismatch of time synchronization, the packet A-0 220 transmitted from Q[n+1] of Node_A in cycle X may be received as B-0 223 by Q[n+1] of Node_B in cycle Y−1 and a packet 224 may be transmitted to the next node (not shown) in cycle Y, which is the next cycle.

In the same manner, unlike that case shown in FIG. 1, the packet A-1 221 transmitted from Q[n+1] of Node_A in cycle X is received as B-1 225 by Q[n] of Node_B in cycle Y due to mismatch of time synchronization. Because of this reason, a packet 227 is transmitted to the next node (not shown) in cycle Y+1, which is the next cycle, whereby packets B-0 223 and B-1 225 received by Node_B in Node_A's same cycle, i.e., cycle X, may cause a malfunction where packets 224 and 227 are separately transmitted in different cycles, i.e., cycle Y and cycle Y+1.

In addition, the packets A-1 221 and A-2 222 transmitted from Node_A in different cycles may cause a malfunction where packets 227 and 228 are consecutively transmitted in the same cycle, i.e., cycle Y+1, of Node_B.

Figure 3:
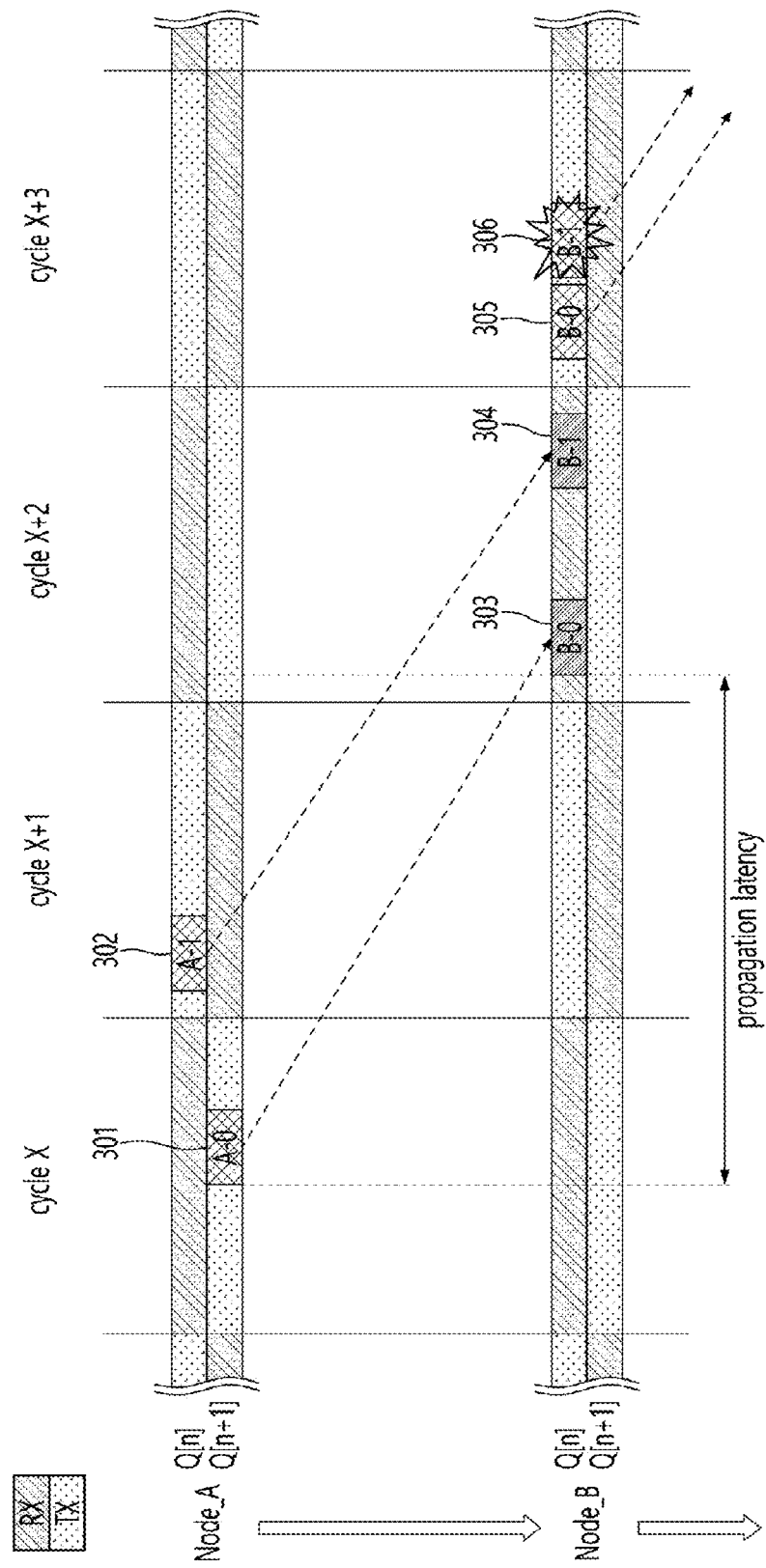
FIG. 3 is a view illustrating an example of a timing diagram for describing a malfunction occurring in a case where transmission delay of a path between nodes is greater than a cycle time of a node during a CQF operation or in a case where packets are not received in specified cycles due to transmission delay deviation according to various embodiments of the present disclosure.

FIG. 3 is a view illustrating an example of a timing diagram for describing a malfunction occurring in a case where transmission delay of a path between nodes is greater than a cycle time of a node during a CQF operation or in a case where packets are not received in specified cycles due to transmission delay deviation according to various exemplary embodiments of the present disclosure. FIG. 3 may assume the CQF operation shown in FIG. 1.

Referring to FIG. 3, even in situations where time synchronization matches between two nodes Node_A and Node_B, link transmission delay between the nodes is greater than a cycle time of the nodes or link transmission delay deviation between the nodes increases, so a phenomenon of not receiving packets in specified cycles occurs, thereby causing a problem in that the packets received in cycles different from each other are transmitted consecutively in one cycle.

More specifically, in Q[n+1] of Node_A, a packet A-0 301 to be transmitted within cycle X may be stored, and in Q[n], a packet A-1 302 to be transmitted within cycle X+1 may be stored. The packets 301 and 302 are packets set to belong to the same flow, but for convenience of description, it may be assumed that only packets set to belong to a single flow are transmitted. It is assumed that a configuration of the two nodes is the same as the description shown in FIG. 1. In a case where the link transmission delay between the two nodes is greater than a cycle time and link transmission delay deviation is large, the packet A-0 301 transmitted from Q[n+1] of Node_A in cycle X may be received as B-0 303 by Q[n] of Node_B in cycle X+2, and a packet 305 may be transmitted to the next node (not shown) in cycle X+3, which is the next cycle.

In the same manner, unlike that case shown in FIG. 1, the packet A-1 302 transmitted from Q[n] of Node_A in cycle X+1 is not received by Q[n+1] of Node_B in cycle X+3 due to link transmission delay between the nodes greater than the cycle time of each node and link transmission delay deviation between the nodes, but is received as B-1 304 by Q[n] of Node_B in cycle X+2. Because of this reason, a packet 306 is transmitted to the next node (not shown) in cycle X+3, which is the next cycle, whereby packets B-0 303 and B-1 304 received by Node_B in Node_A's different cycles, i.e., in cycle X and cycle X+1 may cause a malfunction where packets 305 and 306 are consecutively transmitted in the same cycle, i.e., cycle X+3.

Figure 4A:
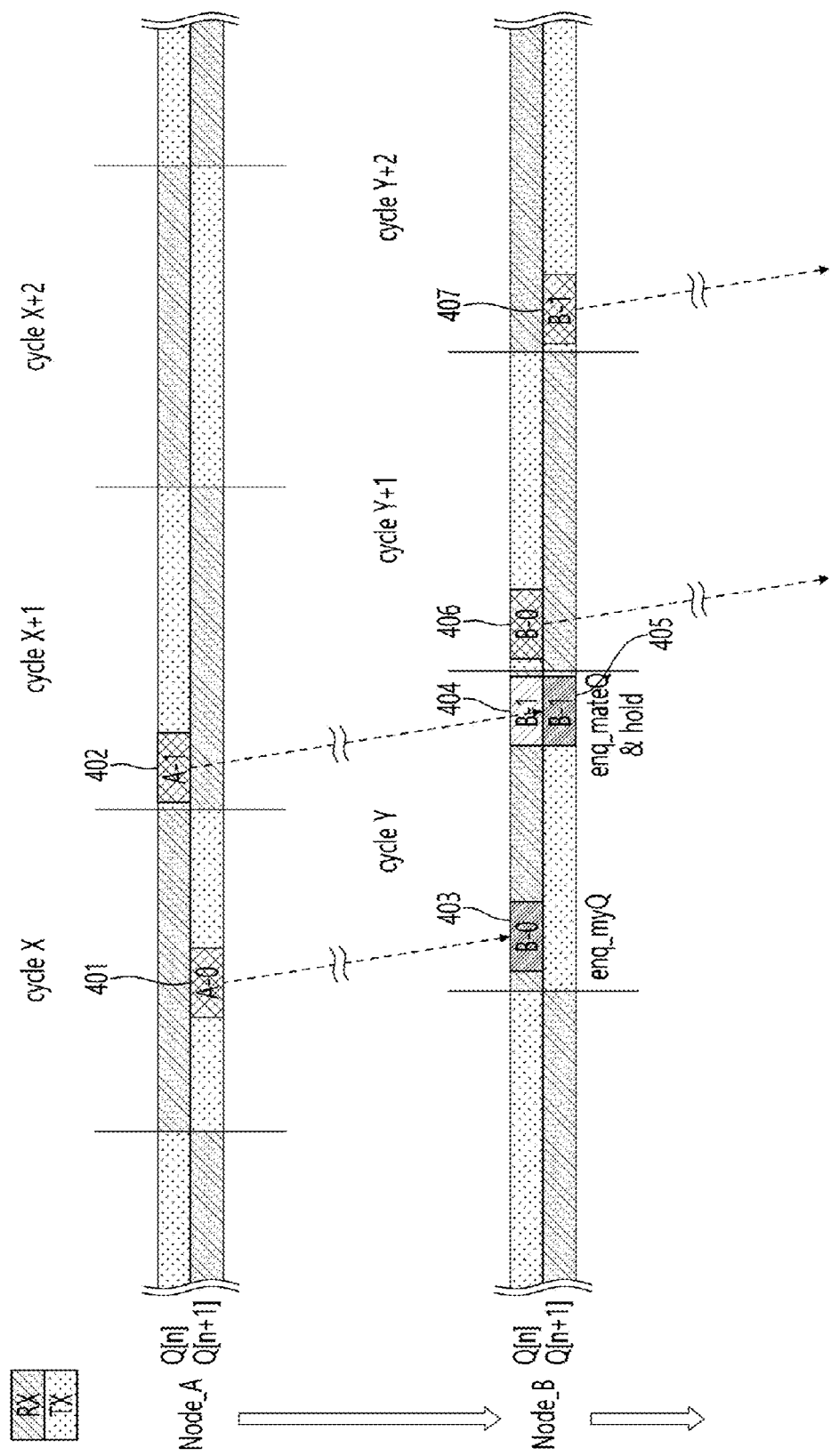
FIG. 4A is a view illustrating a timing diagram of a first exemplary embodiment for describing an operation to which a CQF method is applied according to an exemplary embodiment of the present disclosure.

FIG. 4A is a view illustrating a timing diagram of a first exemplary embodiment for describing an operation to which a CQF method is applied according to an exemplary embodiment of the present disclosure.

Referring to FIG. 4A, in situations where malfunctions such as those shown in FIGS. 2 and 3 occur, a cycle parameter rx_cycle of each packet being received, a cycle parameter internal_cycle for performing a CQF operation of a reception node, and a queuing state parameter internal_enq_state of an enqueue process are used, so that in a case where a packet of a different cycle from that of a previously received packet is received within the same cycle, this packet is not stored in a currently receiving queue myQ, but is stored in a different queue mateQ currently performing transmission and a hold bit is set to "1", so that subsequent output cycles are separated, whereby the malfunctions as shown in FIGS. 2 and 3 may be prevented.

Specifically, in Q[n+1] of Node_A, a packet A-0 401 to be transmitted within cycle X may be stored, and in Q[n], a packet A-1 402 to be transmitted within cycle X+1 may be stored. The packets 401 and 402 are packets set to belong to the same flow, but for convenience of description, it may be assumed that only packets set to belong to a single flow are transmitted. In an environment where time synchronization of Node_A and Node_B does not match, a situation is assumed that link transmission delay between the two nodes is greater than a cycle time of each node or link transmission delay deviation between the nodes increases, so packets are not received in specified cycles. When a packet A-0 401 transmitted from Q[n+1] of Node_A in cycle X is received by Node_B in cycle Y, a packet received (under a condition that the received packet A-0 401 is not the first packet and a queuing state prev_internal_enq_state of an enqueue process for a previous packet is enq_myQ) may be stored as B-0 403 in Q[n] by performing an enqueue process (S101→S102→S103→S104→S113) in accordance with a process defined in an enqueue flowchart 731 of the CQF method according to the present disclosure. In this case, the received packet is stored in a state enq_myQ, and an enqueue state table 735 may be updated according to the process defined in the enqueue flowchart 731. The stored packet 403 performs a dequeue process (S201→S202→S203→S204→S206) in accordance with a process defined in a dequeue flowchart 734 of the CQF method according to the present disclosure, whereby a packet 406 may be output in cycle Y+1 of Node_B.

In the same manner, when a packet A-1 402 transmitted from Q[n] of Node_A in cycle X+1 is received in cycle Y of Node_B, packets 403 and 404 classified into the same flow are input in a state having different cycles (i.e., the packet 403 in cycle X and the packet 404 in cycle X+1) in the same cycle Y, so the packet is not stored as B-1 404 in Q[n], but the packet received as a packet B-1 405 may be stored in Q[n+1] by performing an enqueue process (S101→S102→S103→S104→S115) in accordance with the process defined in the enqueue flowchart 731 of the CQF method according to the present disclosure. In this case, the received packet is stored in a state enq_mateQ_hold, and the enqueue state table 735 may be updated according to the process defined in the enqueue flowchart 731. The stored packet 405 performs a dequeue process (S201→S202→S203→S204→S205) in accordance with the process defined in the dequeue flowchart 734 of the CQF method according to the present disclosure, whereby a packet 407 may be output in cycle Y+2 of Node_B.

Figure 4B:
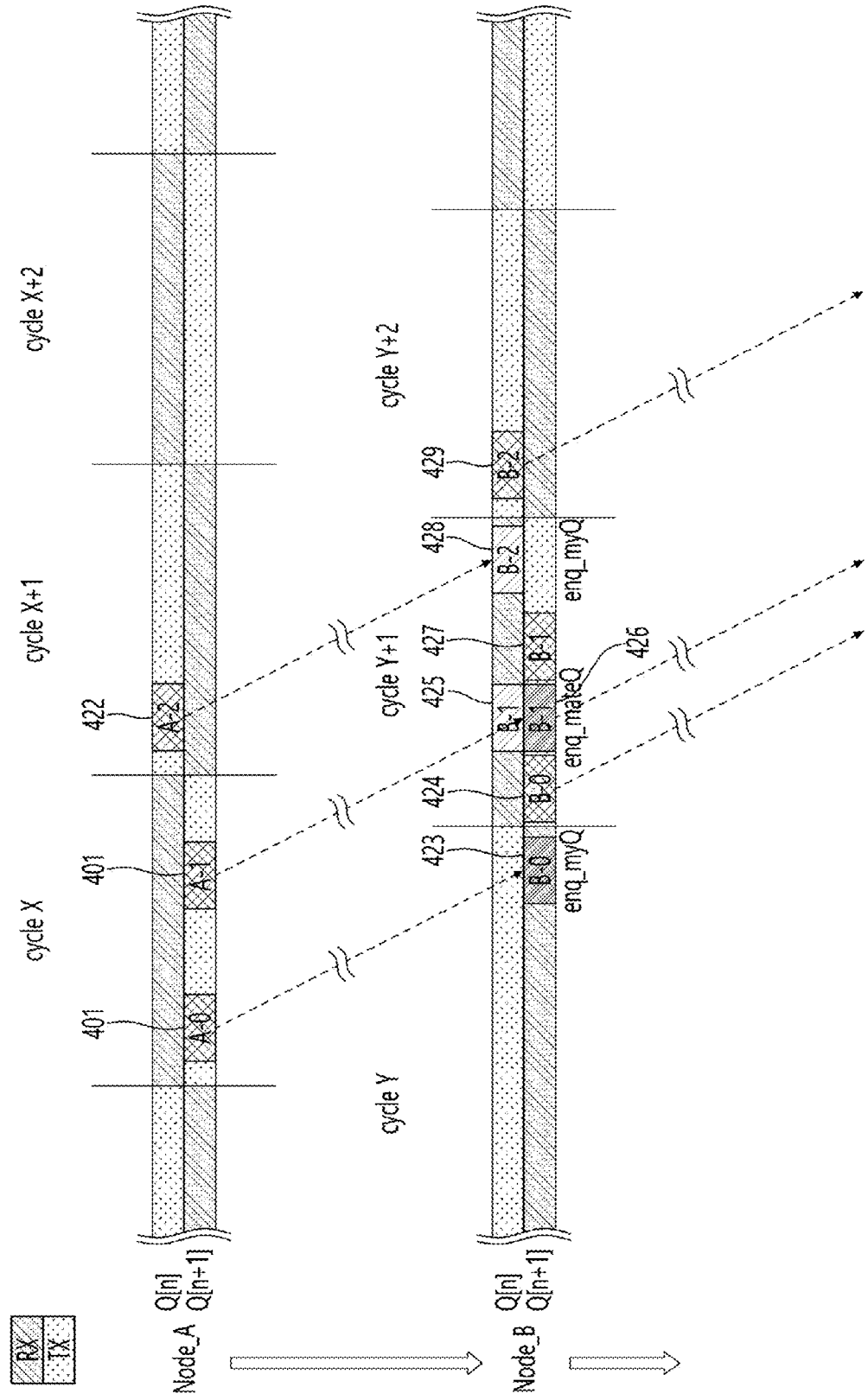
FIG. 4B is a view illustrating a timing diagram of a second exemplary embodiment for describing an operation to which a CQF method is applied according to the exemplary embodiment of the present disclosure.

FIG. 4B is a view illustrating a timing diagram of a second exemplary embodiment for describing an operation to which a CQF method is applied according to the exemplary embodiment of the present disclosure.

Referring to FIG. 4B, in situations where a malfunction such as that shown in FIG. 2B occurs, a cycle parameter of a received packet, a cycle parameter for performing the CQF operation of a reception node, and a queuing state parameter of an enqueue process are used, so that in a case where packets transmitted in the same cycle from a transmission node are received in different cycles by the reception node, these packets are stored in a different queue mateQ currently performing transmission instead of storing these packets in a currently receiving queue myQ, and the packets are configured to be output in the same cycle, whereby the malfunction as shown in FIG. 2B may be prevented.

Specifically, in Q[n+1] of Node_A, packets A0 420 and A-1 421 to be transmitted within cycle X are stored, and in Q[n], a packet A-2 422 to be transmitted within cycle X+1 is stored. The packets 420 and 422 are packets set to belong to the same flow, but for convenience of description, it may be assumed that only packets set to belong to a single flow are transmitted. In an environment where time synchronization of Node_A and Node_B does not match, a situation is assumed that link transmission delay between the two nodes is greater than a cycle time of each node or link transmission delay deviation between the nodes increases, so packets are not received in specified cycles. When a packet A-0 420 transmitted from Q[n+1] of Node_A in cycle X is received in cycle Y of Node_B, a packet received (under a condition that the received packet A-0 401 is not the first packet and a state prev_internal_enq_state is enq_myQ) may be stored as B-0 423 in Q[n] by performing the enqueue process (S101→S102→S103→S104→S113) in accordance with the process defined in an enqueue flowchart 631 of the CQF method according to the present disclosure. In this case, the received packet is stored in a state enq_myQ, and an enqueue state table 635 may be updated according to a process defined in the enqueue flowchart 631. The stored packet 423 performs the dequeue process (S201→S202→S203→S204→S206) in accordance with the process defined in a dequeue flowchart 634 of the CQF method according to the present disclosure, whereby a packet 424 may be output in cycle Y+1 of Node_B.

In the same manner, when a packet A-1 421 transmitted from Q[n+1] of Node_A in cycle X is received in cycle Y+1 of Node_B, packets 420 and 421 transmitted in the same cycle X+1 are received in different cycles cycle Y and cycle Y+1, so the packet is not stored as B-1 425 in Q[n], but the packet received as a packet B-1 426 may be stored in Q[n+1] by performing an enqueue process (S101→S102→S103→S105→S114) in accordance with the process defined in the enqueue flowchart 631 of the CQF method according to the present disclosure. In this case, the received packet is stored in a state enq_mateQ, and the enqueue state table 635 may be updated according to the process defined in the enqueue flowchart 631. The stored packet 426 performs a dequeue process (S201→S202→S207→S208→S209) in accordance with the process defined in the dequeue flowchart 634 of the CQF method according to the present disclosure, whereby a packet 427 may be output in cycle Y+1 of Node_B.

Meanwhile, when a packet A-2 422 transmitted from Q[n] of Node_A in cycle X+1 is received in cycle Y+1 of Node_B, packets 421 and 422 classified into the same flow in the same cycle, i.e., cycle Y+1, in a state where prev_internal_enq_state is enq_mateQ are input in a state of having different cycles (i.e., the packet 421 in cycle X and the packet 422 in cycle X+1), the packet may be stored as B-2 428 in Q[n] by performing an enqueue process (S101→S102→S106→S107→S108→S113) in accordance with the process defined in the enqueue flowchart 631 of the CQF method according to the present disclosure. In this case, the received packet is stored in a state enq_myQ, and an enqueue state table 635 may be updated according to the process defined in the enqueue flowchart 631. The stored packet 428 performs the dequeue process (S201→S202→S203→S204→S206) in accordance with the process defined in the dequeue flowchart 634 of the CQF method according to the present disclosure, whereby a packet 429 may be output in cycle Y+2 of Node_B.

Figure 5:
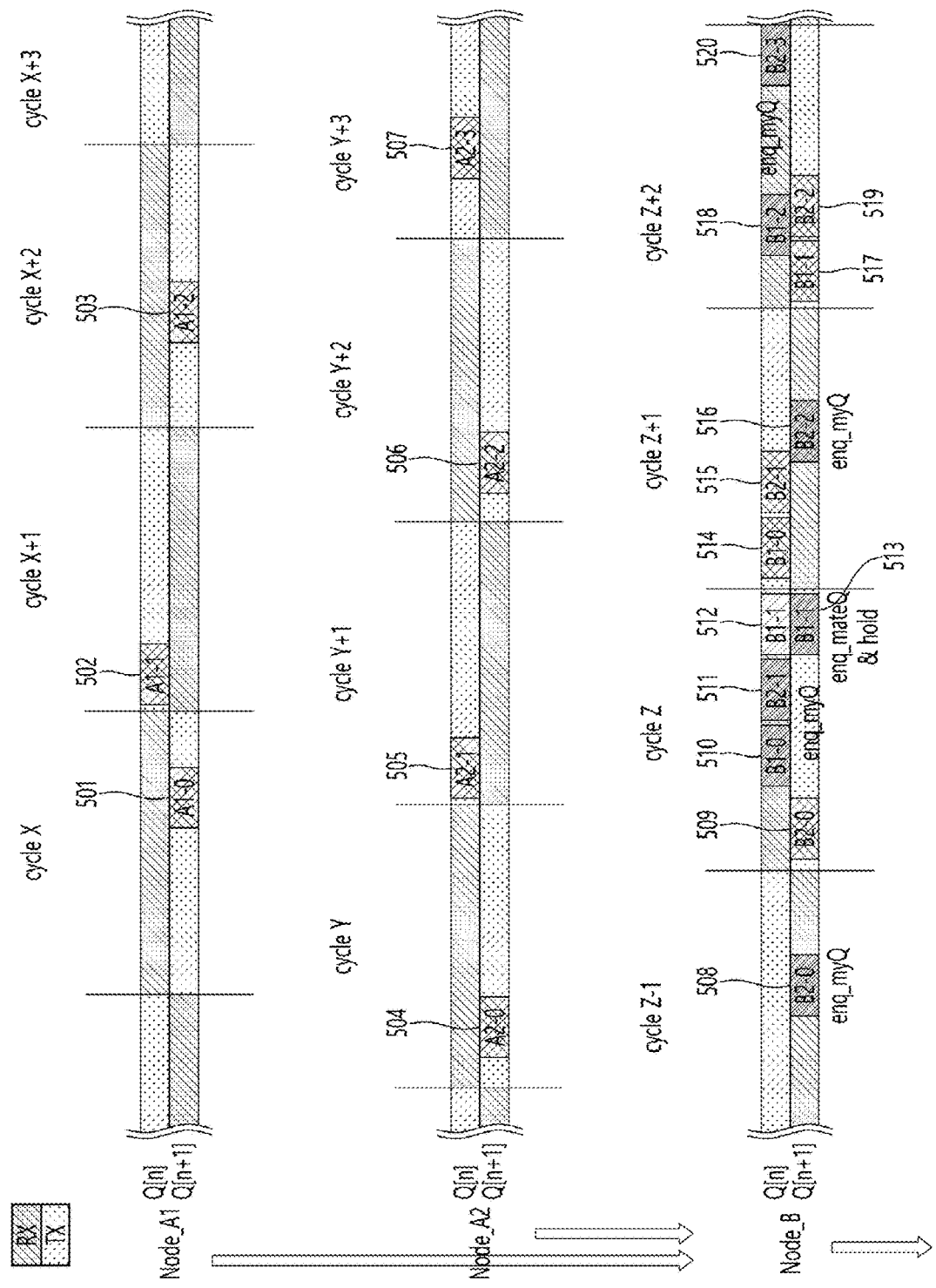
FIG. 5 is a view illustrating a timing diagram of a third exemplary embodiment for describing an operation to which a CQF method is applied according to the exemplary embodiment of the present disclosure.

FIG. 5 is a view illustrating a timing diagram of a third exemplary embodiment for describing an operation to which a CQF method is applied according to the exemplary embodiment of the present disclosure.

Referring to FIG. 5, as an example of a case where packets are transmitted from two nodes Node_A1 and Node_A2 and the packets are received by Node_B, in situations where the malfunctions shown in FIGS. 2 and 3 occur, a cycle parameter of each received packet, a cycle parameter for performing a CQF operation of a reception node, and a queuing state parameter of an enqueue process are used, so that in a case where packets of cycles different from that of a previously received packet are received within the same cycle, these packets are stored in a different queue mateQ currently performing transmission instead of storing these packets in a currently receiving queue myQ, so that subsequent output cycles are separated, whereby the malfunctions as shown in FIGS. 2 and 3 may be prevented.

More specifically, in Q[n+1] of Node_A1, packets A1-0 501 to be transmitted within cycle X and A1-2 503 to be transmitted within cycle X+2 may be stored, and in Q[n], a packet A1-1 502 to be transmitted within cycle X+1 may be stored. The packets 501 to 503 are packets set to belong to the same flow, but may be classified into a different flow from that of the packets 504 to 507 transmitted from Node_A2. For convenience of description, in Node_A1, it may be assumed that only packets set to belong to a single flow are transmitted.

In Q[n+1] of Node_A2, packets A2-0 504 to be transmitted within cycle Y and A2-2 506 to be transmitted within cycle Y+2 may be stored, and in Q[n], packets A2-1 505 to be transmitted within cycle Y+1 and A2-3 507 to be transmitted within cycle Y+3 may be stored. The packets 504 to 507 are packets set to belong to the same flow, but may be classified into a different flow from that of the packets 501 to 503 transmitted from Node_A1. For convenience of description, in Node_A2, it may be assumed that only packets set to belong to a single flow are transmitted. In an environment where time synchronization of Node_A and Node_B does not match, it is assumed that link transmission delay between Node_A1 and Node_B and link transmission delay between Node_A2 and Node_B are greater than a cycle time of each node or link transmission delay deviation between the nodes increases, so the packets are not received in specified cycles. When a packet A-1 501 transmitted from Q[n+1] of Node_A1 in cycle X is received in cycle Z of by Node_B, a packet received (under a condition that the received packet A1-0 501 is not the first packet and a state of prev_internal_enq_state is enq_myQ) may be stored as B1-0 510 in Q[n] by performing the enqueue process (S101→S102→S103→S104→S113) in accordance with the process defined in the enqueue flowchart 731 of the CQF method according to the present disclosure.

In this case, the received packet is stored in an enq_myQ state, and the enqueue state table 735 may be updated according to the process defined in the enqueue flowchart 731. The stored packet 510 performs the dequeue process (S201→S202→S203→S204→S206) in accordance with the process defined in the dequeue flowchart 734 of the CQF method according to the present disclosure, whereby a packet 514 may be output in cycle Z+1 of Node_B.

In the same manner, when a packet A1-1 502 transmitted from Q[n] of Node_A1 in cycle X+1 is received in cycle Z of Node_B, packets 510 and 512 classified into the same flow are input in a state having different cycles (i.e., the packet 510 in cycle X and the packet 512 in cycle X+1) in the same cycle Z, so the packet is not stored as B1-1 512 in Q[n], but the packet received as B-1 513 may be stored in Q[n+1] by performing the enqueue process (S101→S102→S103→S104→S115) in accordance with the process defined in the enqueue flowchart 731 of the CQF method according to the present disclosure.

In this case, the received packet is stored in a state enq_mateQ_hold, and the enqueue state table 735 may be updated according to the process defined in the enqueue flowchart 731. The stored packet 513 performs the dequeue process (S201→S202→S203→S204→S205) in accordance with the process defined in the dequeue flowchart 734 of the CQF method according to the present disclosure, whereby a packet 517 may be output in cycle Z+2 of Node_B.

In the same manner, when a packet A1-2 503 transmitted from Q[n+1] of Node_A1 in cycle X+2 is received in cycle Z+2 of Node_B, the packet received as a packet B1-2 518 may be stored in Q[n] by performing an enqueue process (S101→S102→S106→S109→S110→S111→S113) in accordance with the process defined in the enqueue flowchart 731 of the CQF method according to the present disclosure.

In this case, the received packet is stored in an enq_myQ state, and the enqueue state table 735 may be updated according to the process defined in the enqueue flowchart 731. The stored packet 518 performs the dequeue process (S201→S202→S203→S204→S206) in accordance with the process defined in the dequeue flowchart 734 in the cyclic queuing and forwarding method according to the present disclosure, whereby the packet (not shown) may be output in cycle Z+3 of Node_B.

When a packet A2-0 504 transmitted from Q[n+1] of Node_A2 in cycle Y is received in cycle Z−1 of Node_B, the packet received (under a condition that the received packet A2-0 504 is not the first packet and a state of prev_internal_enq_state is enq_myQ) may be stored in Q[n+1] as B2-0 508 by performing the enqueue process (S101→S102→S103→S104→S113) in accordance with the process defined in the enqueue flowchart 731 of the CQF method according to the present disclosure. In this case, the packet received is stored in an enq_myQ state, and the enqueue state table 735 may be updated according to a process defined in the enqueue flowchart 731. The stored packet 508 performs the dequeue process (S201→S202→S203→S204→S206) in accordance with the process defined in the dequeue flowchart 734 of the CQF method according to the present disclosure, whereby a packet 509 may be output in cycle Z of Node_B.

In the same manner, when a packet A2-1 505 transmitted from Q[n] of Node_A2 in cycle Y+1 is received in cycle Z of Node_B, the packet received as a packet B2-1 511 may be stored in Q[n] by performing the enqueue process (S101→S102→S103→S104→S113) in accordance with the process defined in the enqueue flowchart 731 of the CQF method according to the present disclosure. In this case, the packet received is stored in a state enq_myQ, and the enqueue state table 735 may be updated according to the process defined in the enqueue flowchart 731.

The stored packet 511 performs the dequeue process (S201→S202→S207→S208→S209) in accordance with the process defined in the dequeue flowchart 734 in the cyclic queuing and forwarding method according to the present disclosure, whereby a packet 515 may be output in cycle Z+1 of Node_B.

In the same manner, when a packet A2-2 506 transmitted from Q[n+1] of Node_A2 in cycle Y+2 is received in cycle Z+1 of Node_B, the packet received as a packet B2-2 516 may be stored in Q[n+1] by performing the enqueue process (S101→S102→S103→S104→S113) in accordance with the process defined in the enqueue flowchart 731 of the CQF method according to the present disclosure. In this case, the received packet is stored in a state enq_myQ, and the enqueue state table 735 is updated according to the process defined in the enqueue flowchart 731. The stored packet 516 performs a dequeue process (S201→S202→S207→S203 S204→S206) in accordance with the process defined in the dequeue flowchart 734 in the cyclic queuing and forwarding method according to the present disclosure, whereby the packet 519 may be output in cycle Z+2 of Node_B.

In the same manner, when a packet A2-3 507 transmitted from Q[n] of Node_A2 in cycle Y+3 is received in cycle Z+2 of Node_B, the packet received as a packet B2-3 520 may be stored in Q[n] by performing the enqueue process (S101→S102→S103→S104→S113) in accordance with the process defined in the enqueue flowchart 731 of the CQF method according to the present disclosure.

In this case, the received packet is stored in a state enq_myQ state, and the enqueue state table 735 is updated according to the process defined in the enqueue flowchart 731. The stored packet 520 performs the dequeue process (S201→S202→S203→S204→S206) in accordance with the process defined in the dequeue flowchart 734 in the cyclic queuing and forwarding method according to the present disclosure, whereby the packet (not shown) may be output in cycle Z+3 of Node_B.

Figure 6:
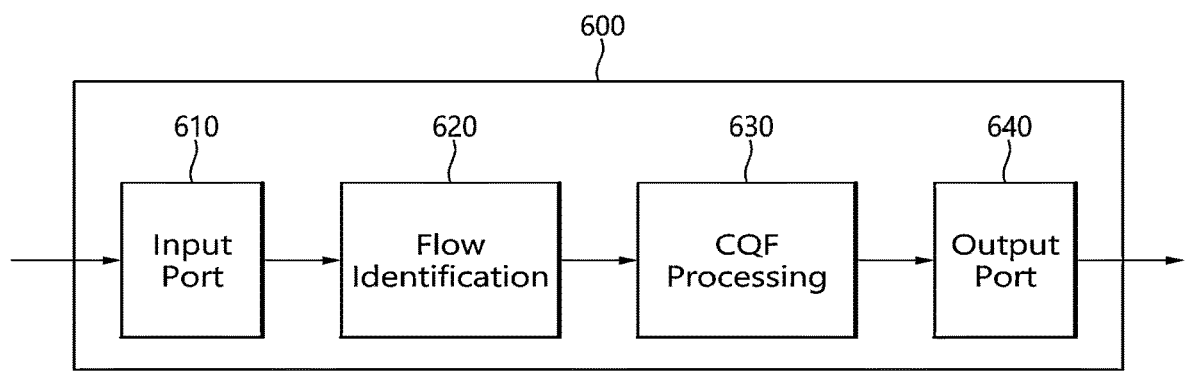
FIG. 6 is a view illustrating a packet processing block diagram of a network node for performing the CQF method according to the exemplary embodiments of the present disclosure.

FIG. 6 is a view illustrating a packet processing block diagram of a network node for performing the CQF method according to the exemplary embodiments of the present disclosure.

Referring to FIG. 6, a network node 600 for performing the CQF method according to various exemplary embodiments of the present disclosure may be configured to include: an input port 610 for receiving packets requiring deterministic latency guarantees; a flow identification block 620 for receiving the packets from the input port and classifying the packets by flow; a CQF processing block 630 configured to guarantee the end-to-end deterministic latency by using two queues for each flow classified by the flow identification block and alternately repeating reception and transmission of the packets in cycle time units; and an output port 640 for outputting the packets on which the CQF processing has been completed. In the flow identification block 620, a flow may be identified by using various header information of the input packets for flow identification.

Figure 7:
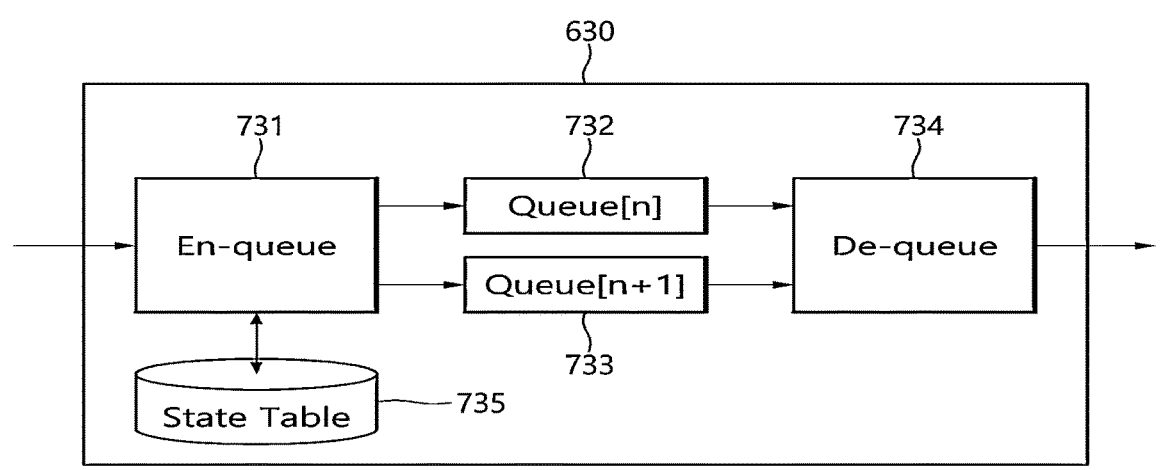
FIG. 7 is a view illustrating a detailed block diagram of a CQF processing block among packet processing blocks for performing the CQF method according to the exemplary embodiments of the present disclosure.

FIG. 7 is a view illustrating a detailed block diagram of a CQF processing block among packet processing blocks for performing the CQF method according to the exemplary embodiments of the present disclosure.

Referring to FIG. 7, the CQF processing block 630 for performing the CQF method according to various exemplary embodiments of the present disclosure may be configured to include: an enqueue block 731 configured to perform a process for receiving and storing input packets in two queues 732 and 733 at a preset cycle time as a period; an enqueue state table 735 for managing parameters required for the enqueue process for each flow ID; the queues 732 and 733 for alternately storing and transmitting the received packets; and a dequeue block 734 configured to perform a process for alternately transmitting the packets stored in the queues.

Figure 8:
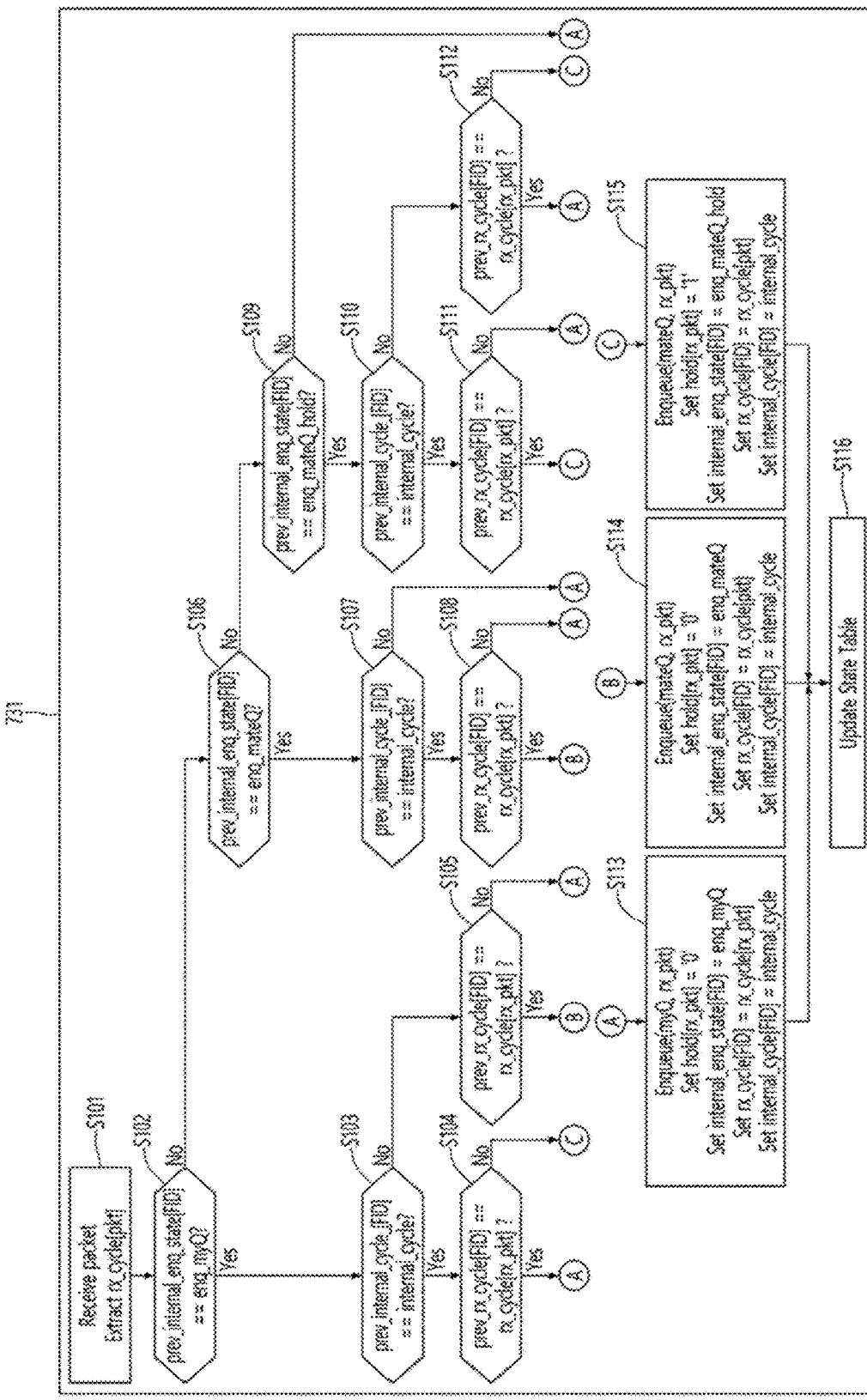
FIG. 8 is a view illustrating a flowchart for packet processing of an enqueue block among the packet processing blocks for performing the cyclic queuing and forwarding method according to the exemplary embodiments of the present disclosure.

FIG. 8 is a view illustrating a flowchart for packet processing of an enqueue block among the packet processing blocks for performing the cyclic queuing and forwarding method according to the exemplary embodiments of the present disclosure.

Figure 9:
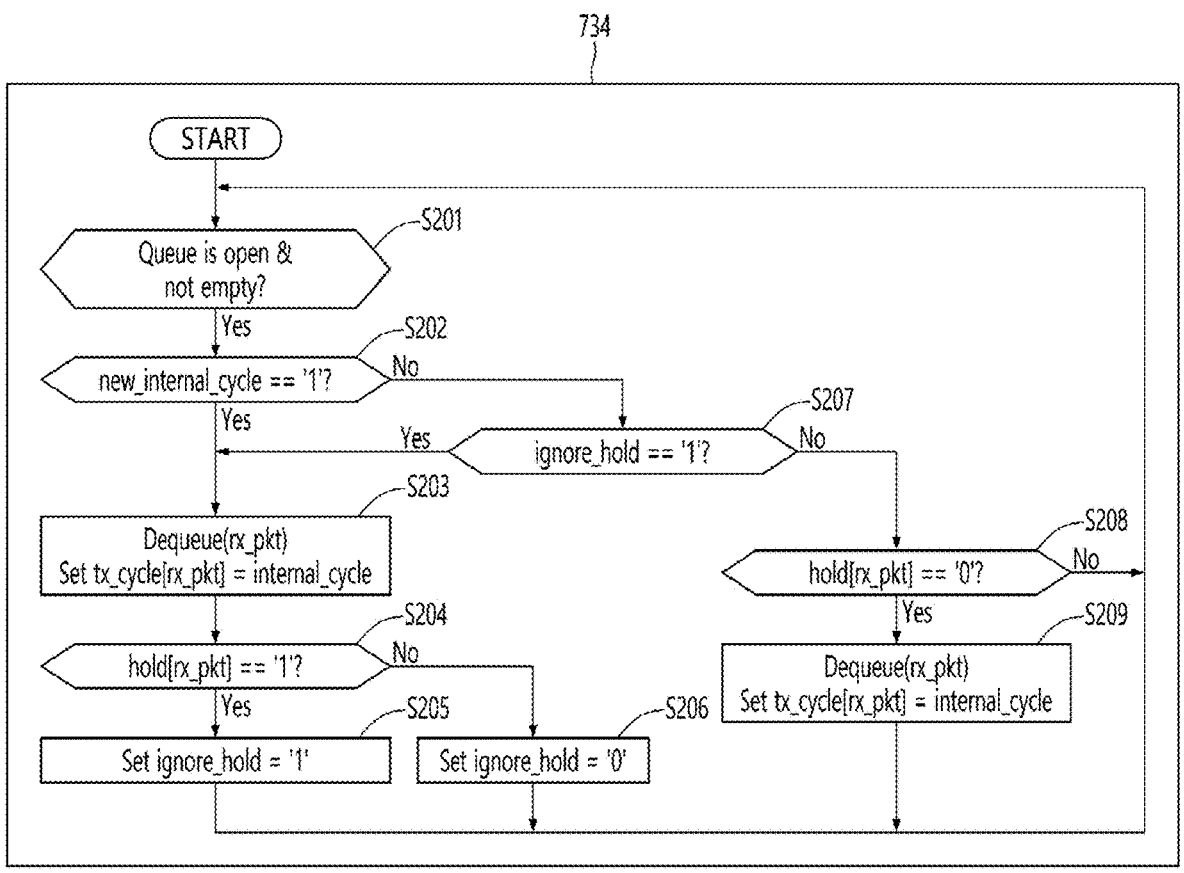
FIG. 9 is a view illustrating a flowchart for describing a packet processing process of a dequeue block among the packet processing blocks for performing the cyclic queuing and forwarding method according to the exemplary embodiments of the present disclosure.

FIG. 9 is a view illustrating a flowchart for describing a packet processing process of a dequeue block among the packet processing blocks for performing the cyclic queuing and forwarding method according to the exemplary embodiments of the present disclosure.

Descriptions of parameters and signals used in FIGS. 8 and 9 are as follows.

rx_cycle: this is a cycle parameter of a received packet, and may have a value of "even" or "odd". This is extracted from one of specific fields 1201 to 1203 of the received packet, and each time the received packet is stored in one of queues 732 and 733, a cycle parameter 1020 of the received packet is updated for each flow ID 1010 in an enqueue state table 735.

tx_cycle: this is a cycle parameter of a transmitting packet, and may have a value of "even" or "odd". When transmission is performed, this may store internal_cycle in one of the specific fields 1201 to 1203 used to transmit the cycle parameters of the packet.

internal_cycle: this is a current cycle parameter for performing a CQF operation at a node that received a packet, and has a value of "even" or "odd". Each time the received packet is stored in one of the queues 732 and 733, a current cycle parameter 1030 for performing the CQF operation may be updated for each flow ID 1010 in the enqueue state table 735.

internal_enq_state: when an enqueue process 731 of CQF processing is performed, this parameter may have a value of "enq_myQ", "enq_mateQ", or "enq_mateQ_hold" as a queuing state parameter of a corresponding packet. Each time the received packet is stored in one of the queues 732 and 733, a queuing state parameter 1040 of the corresponding packet may be updated for each flow ID 1010 in the enqueue state table 735.

enq_myQ: when the enqueue process 41 the CQF processing is performed, this refers to a state in which a corresponding packet is stored in a queue myQ currently performing reception, and in this case, a "hold" bit may be set to "o".

enq_mateQ: when the enqueue process 731 of the CQF processing is performed, this refers to a state in which a corresponding packet is not stored in a queue currently performing reception, but is stored in a queue mateQ currently performing transmission, and in this case, a "hold" bit may be set to "0".

enq_mateQ_hold: when the enqueue process 731 of the CQF processing is performed, this refers to a state in which a corresponding packet is not stored in a queue currently performing reception, but is stored in a queue mateQ currently performing transmission, and in this case, a "hold" bit may be set to "1".

prev_rx_cycle: when the enqueue process 731 of the CQF processing is performed, this is a "rx_cycle" parameter 1020 of a previously received packet classified by flow, and may be stored for each flow ID 1010 in the enqueue state table 735.

prev_internal_cycle: prev_internal_cycle: when the enqueue process 731 of the CQF processing is performed, this is an "internal_cycle" parameter 1030 of the previously received packet classified by flow, and may be stored for each flow ID 1010 in the enqueue state table 735.

prev_internal_enq_cycle: when the enqueue process 731 of the CQF processing is performed, this is an "internal_enq_state" parameter 1040 of the previously received packet classified by flow, and may be stored for each flow ID 1010 in the enqueue state table 735.

new_internal_cycle: when a dequeue process 734 of the CQF processing is performed, this is set to "1" in a case where a current "internal_cycle" ends and a new "internal_cycle" starts. Thereafter, this parameter may be set to "0" when the first dequeue process is performed at the corresponding "internal_cycle" and a packet is transmitted.

hold: when the enqueue process 734 of the CQF processing is performed, a "hold" bit of meta data 1101 of a corresponding packet is set to "1" in a case where an enqueue state of the corresponding packet is "enq_mateQ_hold", so as to prevent a phenomenon in which the corresponding packet is output in a current cycle internal_cycle. The "hold" bit of the meta data 1101 of the corresponding packet is set to "0" in a case where an enqueue state of the corresponding packet is "enq_myQ" or "enq_mateQ".

ignore_hold: when the dequeue process 734 of the CQF processing is performed, an "ignore_hold" bit is set to "1" in order to transmit a corresponding packet regardless of a "hold" bit at a start time point of a current cycle in a case where the packet having an enqueue state "enq_mateQ_hold" and having a "hold" bit set to "1" in a previous cycle prev_internal_cycle is stored in one of the queues 732 and 733, and may continue to keep the "ignore_hold" bit at "1" in a case where the packet having the "hold" bit thereof set to "1" is output after the current cycle starts. Thereafter, the "ignore_hold" bit is set to "0" when a packet having the "hold" bit thereof set to "0" is output or the "hold" bit of the first output packet is set to "0". In addition, the "ignore_hold" bit is set to "0" when each of the corresponding queues 732 and 733 is in an "empty" state. After the first packet is output, an output to be restricted when a packet having a "hold" bit thereof set to "1" is stored in a queue in a state where an "ignore_hold" bit is set to "0".

Referring to FIG. 8, in step S101, when a packet is input, a packet processing process of an enqueue block 731 may extract rx_cycle from the received packet.

In step S102, by identifying prev_internal_enq_state of a corresponding flow stored in an enqueue state table 735, the process may move to step S103 when a previous state is enq_myQ, or else the process may move to step S106.

In step S103, by comparing prev_internal_cycle of a corresponding flow stored in an enqueue state table 635 and internal_cycle with each other, the process may move to step S104 when they are the same, or else the process may move to step S105.

In step S104, by comparing rx_cycle of the received packet and prev_rx_cycle of the corresponding flow stored in the enqueue state table 635 with each other, the process may move to step S113 when they are the same, or else the process may move to step S115.

In step S105, by comparing rx_cycle of the received packet and prev_rx_cycle of the corresponding flow stored in the enqueue state table 635 with each other, the process may move to step S114 when they are the same, or else the process may move to step S113.

In step S106, by checking prev_internal_enq_state of the corresponding flow stored in the enqueue state table 635, the process may move to step S107 when a previous state is enq_mateQ, or else the process may move to step S109.

In step S107, by comparing prev_internal_cycle of the corresponding flow stored in the enqueue state table 635 and internal_cycle with each other, the process may move to step S108 when they are the same, or else the process may move to step S113.

In step S108, by comparing rx_cycle of the received packet and prev_rx_cycle of the corresponding flow stored in the enqueue state table 635 with each other, the process may move to step S114 when they are the same, or else the process may move to step S113.

In step S109, by checking prev_internal_enq_state of the corresponding flow stored in the enqueue state table 635, the process may move to step S110 when a previous state is enq_mateQ_hold, or else the process may move to step S113.

In step S110, by comparing prev_internal_cycle of the corresponding flow stored in the enqueue state table 635 and internal_cycle with each other, the process may move to step S111 when they are the same, or else the process may move to step S112.

In step S111, by comparing rx_cycle of the received packet and prev_rx_cycle of the corresponding flow stored in the enqueue state table 635 with each other, the process may move to step S115 when they are the same, or else the process may move to step S113.

In step S112, by comparing rx_cycle of the received packet and prev_rx_cycle of the corresponding flow stored in the enqueue state table 635 with each other, the process may move to step S113 when they are the same, or else the process may move to step S115.

In step S113, after setting the hold bit thereof to "0", the received packet is stored in a queue myQ that performs packet reception in a current cycle, and the process may move to step S116 after respectively setting internal_enq_state to enq_myQ, rx_cycle to a cycle (even or odd) of the received packet, and internal_cycle to a current cycle (even or odd), which are for the corresponding flow at this time.

In step S114, after setting the hold bit thereof to "0", the received packet is stored in a queue mateQ that performs packet transmission in a current cycle, and the process may move to step S116 after respectively setting the internal_enq_state to enq_mateQ, rx_cycle to the cycle (even or odd) of the received packet, internal_cycle to the current cycle (even or odd), which are for the corresponding flow at this time.

In step S115, after setting the hold bit thereof to "1", the received packet is stored in the queue mateQ that performs packet transmission in a current cycle, and the process may move to S116 after respectively setting internal_enq_state to enq_mateQ_hold, rx_cycle to the cycle (even or odd) of the received packet, and internal_cycle to the current cycle (even or odd), which are for the corresponding flow at this time.

In step S116, the internal_enq_state 740, rx_cycle 720, and internal_cycle 730 respectively set in steps S113, S114, and S115 may be updated for each corresponding flow ID 710 in the enqueue state table 635.

Referring to FIG. 9, step S201 is a packet processing process of a dequeue block 734, and when states of queues 732 and 733 are identified to determine that a packet is in a transmission state (i.e., an open state) and is stored therein, the process may move to step S202.

In step S202, a new_internal_cycle bit is checked, and when this bit is set to "1", the process may move to step S203, or else move to step S207.

In step S203, the packet stored in a transmission queue may be transmitted, and then the process may move to step S204. In this case, by being added to one of specific fields 1201 to 1203 used to transmit cycle parameters, a cycle parameter of the corresponding packet may be transmitted.

In step S204, by checking the hold bit of the packet transmitted in step S203, the process may move to step S205 when the hold bit is set to "1", or else the process may move to step S206.

In step S205, the process may move to S201 after setting an ignore_hold bit to "1".

In step S206, the process may move to step S201 after setting the ignore_hold bit to "0".

In step S207, by checking the ignore_hold bit, the process may move to step S203 when the ignore_hold bit is set to "1", or else may move to step S208.

In step S208, by checking the hold bit stored with the packet in the transmission queue, the process may move to step S209 when the hold bit is set to "0", or else may move to step S201.

In step S209, the process may move to step S201 after transmitting the packet stored in the transmission queue. In this case, by being added to one of specific fields 1201 to 1203 used to transmit cycle parameters, the cycle parameter of the corresponding packet may be transmitted.

Figures 10, 11:
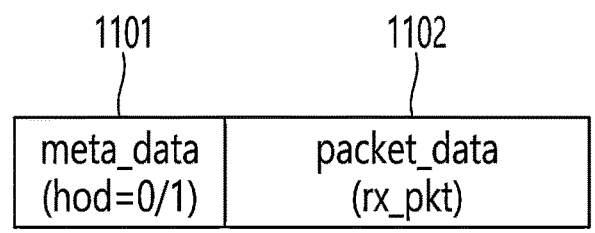
FIG. 10 is a view illustrating a table configuration diagram for describing a configuration of an enqueue state table among the packet processing blocks for performing the CQF method according to the exemplary embodiments of the present disclosure.
FIG. 11 is a view illustrating an exemplary embodiment showing a configuration of data stored in a packet queue for storing and transmitting packets among the packet processing blocks for performing the CQF method according to the exemplary embodiments of the present disclosure.

FIG. 10 is a view illustrating a table configuration diagram for describing a configuration of an enqueue state table among the packet processing blocks for performing the CQF method according to the exemplary embodiments of the present disclosure.

Referring to FIG. 10, an enqueue block 731 may receive packets, the packets are stored in corresponding queues 732 and 733, and then parameters of rx_cycle 1020, internal_cycle 1030, and internal_enq_state 1040 for the packets may be stored and updated for each flow ID 1010 for the reception and storage of packets afterwards.

The flow ID 1010 may be classified by a flow identification block 620 of a CQF packet processing block, and may allow packets having the same service characteristics to be classified into the same flow.

FIG. 11 illustrates an exemplary embodiment showing a configuration of data stored in a packet queue for storing and transmitting packets among packet processing blocks for performing the CQF method according to the exemplary embodiment of the present disclosure.

Referring to FIG. 11, when being stored in a queue through an enqueue process, a received packet may be stored including a hold bit in the meta_data 1101.

Figure 12:
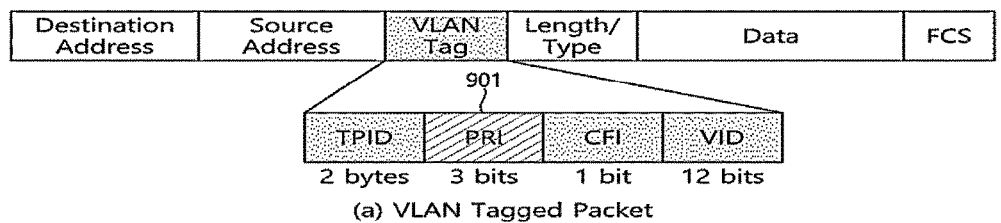
FIG. 12 is views illustrating examples of packet configuration diagrams for specific field configurations for transmitting cycle parameters used to perform the CQF method according to the exemplary embodiments of the present disclosure.
Figure 12:
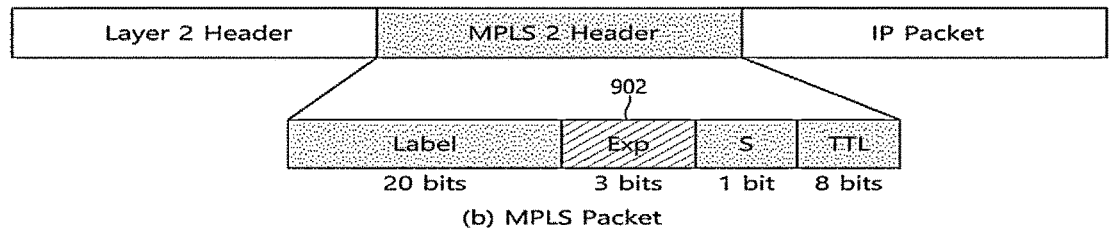
Figure 12:
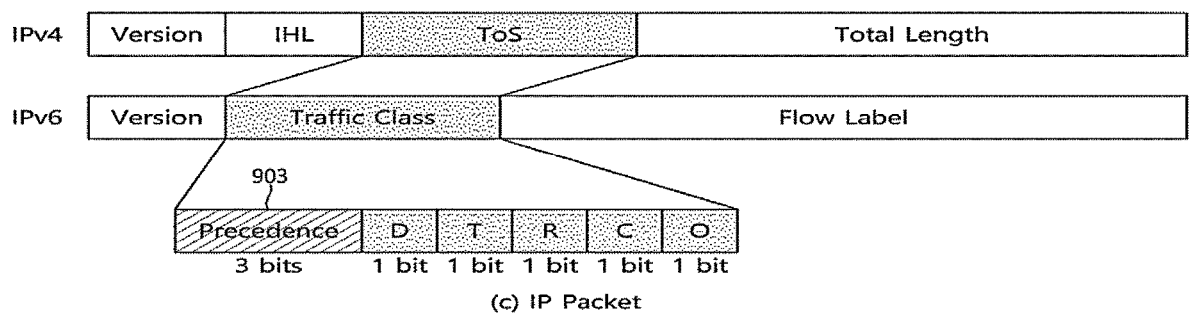

FIG. 12 is views illustrating examples of packet configuration diagrams for specific field configurations for transmitting cycle parameters used to perform the CQF method according to the exemplary embodiments of the present disclosure.

Referring to FIG. 12, when a cycle parameter rx_cycle used to perform the CQF method according to various exemplary embodiments of the present disclosure is included in a packet and the packet is transmitted, the corresponding parameter may be included in various fields of the corresponding packet, so as to be transmitted.

According to an exemplary embodiment, in a case of an Ethernet frame including a virtual local area network (VLAN) tag, an even or odd cycle parameter may be transmitted by using a PRI field 1201 of the VLAN tag.

According to another exemplary embodiment, an even or odd cycle parameter may be transmitted by using an Exp field 1202 of an multiprotocol label switching (MPLS) header.

According to a yet another exemplary embodiment, an even or odd cycle parameter may be transmitted by using a precedence field 1203 of IPV4 type of service (ToS) and IPV6 Traffic Class.

According to various exemplary embodiments of the present disclosure, there may be included a method of operating enqueue packet processing in a communication system, the method including: a process of extracting cycle information of a received packet from the received packet; a process of identifying at least one of whether a queuing state parameter prev_internal_enq_state of an enqueue process for a previous packet for each flow at a reception node indicates a state enq_myQ of the received packet stored in a queue currently performing reception, whether the queuing state parameter prev_internal_enq_state of the enqueue process for the previous packet for each flow indicates a state enq_mateQ of the received packet stored in a queue currently performing transmission, or whether the queuing state parameter prev_internal_enq_state of the enqueue process for the previous packet for each flow indicates a state enq_mateQ_hold of which the received packet is stored in the queue currently performing the transmission and the transmission of the corresponding packet is set to be held in a corresponding cycle; a process of identifying whether a cycle parameter prev_internal_cycle for performing a CQF operation for the previous packet for each flow in the reception node is the same as a cycle parameter internal_cycle for performing the current CQF operation; a process of identifying whether a cycle parameter prev_rx_cycle included in the previously received packet for each flow in the reception node is the same as a cycle parameter rx_cycle included in a currently received packet; and a process of storing (enqueuing) the received packet on the basis of the identifying processes and storing information about the received packet in an enqueue state table for each flow.

According to the exemplary embodiments, there may be further included a process of storing a packet in a queue myQ currently in charge of the reception and then setting a queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation for the previous packet for each flow at the reception node is the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, there may be further included a process of storing a packet in a queue mateQ currently in charge of transmission, setting a hold bit to "1" for a flow, and then setting the queuing state parameter internal_enq_state of the enqueue process to the state enq_mateQ_hold of the packet stored in the queue currently performing the transmission and the transmission of the corresponding packet is set to be held in the corresponding cycle, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation on the previous packet for each flow at the reception node is the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, there may be further included a process of storing a packet in a queue mateQ currently in charge of transmission, setting a hold bit to "0" for a flow, and then setting a queuing state parameter internal_enq_state of the enqueue process to the state enq_mateQ of the packet stored in the queue currently performing the transmission, a cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation on the previous packet for each flow at the reception node is not the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, there may be further included a process of storing a packet in a queue myQ currently in charge of reception and then setting a queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_ cycle for performing the CQF operation for the previous packet for each flow at the reception node is not the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, there may be further included a process of storing a packet in a queue mateQ currently in charge of transmission, setting a hold bit to "0" for a flow, and then setting a queuing state parameter internal_enq_state of the enqueue process to the state enq_mateQ of the packet stored in the queue currently performing the transmission, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node indicates the state enq_mateQ of the packet stored in the queue currently performing transmission, the cycle parameter prev_internal_cycle for performing the CQF operation for the previous packet for each flow at the reception node is the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, there may be further included a process of storing a packet in a queue myQ currently in charge of reception, and then setting a queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node is not the state enq_myQ of the packet stored in the queue currently performing the reception, the queuing state parameter prev_internal_enq_state of the enqueue process for the previous packet for each flow at the reception node is the state enq_mateQ of the packet stored in the queue currently performing transmission, the cycle parameter prev_internal_cycle for performing the CQF operation on the previous packet for each flow at the reception node is the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, there may be further included a process of storing a packet in a queue myQ currently in charge of reception, and then setting a queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node indicates the state enq_mateQ of the packet stored in the queue currently performing transmission, and the cycle parameter prev_internal_cycle for performing the CQF operation for the previous packet for each flow at the reception node is not the same as the cycle parameter internal_cycle for performing the current CQF operation.

According to the exemplary embodiments, there may be further included a process of storing a packet in a queue mateQ currently in charge of transmission, setting a hold bit to "1" for a flow, and then setting a queuing state parameter internal_enq_state of the enqueue process to the state enq_mateQ_hold of which the packet is stored in the queue currently performing the transmission and the transmission of the corresponding packet is set to be held in the corresponding cycle, the cycle parameter rx_cycle included in the received packet for the flow to a cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node does not indicate the state enq_mateQ of the packet stored in the queue currently performing the transmission, the queuing state parameter prev_internal_enq_state of the enqueue process for the previous packet for each flow at the reception node indicates the state enq_mateQ_hold of which the packet is stored in the queue currently performing the transmission and the hold bit is set to "1", the cycle parameter prev_internal_cycle for performing the CQF operation for the previous packet for each flow at the reception node is the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, there may further included a process of storing a packet in the queue myQ currently in charge of reception, and then setting a queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node does not indicate the state enq_mateQ of the packet stored in the queue currently performing transmission, the queuing state parameter prev_internal_enq_state of the enqueue process for the previous packet for each flow at the reception node indicates the state enq_mateQ_hold of which the packet is stored in the queue currently performing the transmission and a hold bit is set to "1", the cycle parameter prev_internal_cycle for performing the CQF operation on the previous packet for each flow at the reception node is the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, there may be further included a process of storing a packet in a queue myQ currently in charge of reception, and then setting a queuing state parameter internal_enq_state of the enqueue process for a flow to the state enq_myQ of the packet stored in the queue currently performing reception, the cycle parameter rx_cycle included in the received packet for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node does not indicate the state enq_mateQ of the packet stored in the queue currently performing transmission, the queuing state parameter prev_internal_enq_state of the enqueue process for the previous packet for each flow at the reception node indicates the state enq_mateQ_hold of which the packet is stored in the queue currently performing the transmission and a hold bit is set to "1", the cycle parameter prev_internal_cycle for performing the CQF operation on the previous packet for each flow at the reception node is not the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, there may be further included a process of storing a packet in a queue mateQ currently in charge of transmission, setting a hold bit to "1" for a flow, and then setting a queuing state parameter internal_enq_state of the enqueue process to the state enq_mateQ_hold of which the packet is stored in the queue currently performing the transmission and the hold bit is set to "1", the cycle parameter rx_cycle included in the packet received for the flow to a cycle parameter included in the received packet, and a cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node does not indicate the state enq_mateQ of the packet stored in the queue currently performing transmission, the queuing state parameter prev_internal_enq_state of the enqueue process for the previous packet for each flow at the reception node indicates the state enq_mateQ_hold of which the packet is stored in the queue currently performing the transmission and the hold is set to "1", the cycle parameter prev_internal_cycle for performing the CQF operation on the previous packet for each flow at the reception node is not the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, there may be further included a process of storing a packet in a queue myQ currently in charge of reception, and then setting a queuing state parameter internal_enq_state of the enqueue process for a flow to the state enq_myQ, the cycle parameter rx_cycle included in the received packet for the flow to a cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node does not indicate the state enq_myQ of the packet stored in the queue currently performing the reception, the queuing state parameter prev_internal_enq_state of the enqueue process for the previous packet for each flow at the reception node does not indicate the state enq_mateQ of the packet stored in the queue currently performing transmission, and the queuing state parameter prev_internal_enq_state of the enqueue process for the previous packet for each flow at the reception node does not indicate the state enq_mateQ_hold of which the packet is stored in the queue currently performing the transmission and a hold bit is set to "1".

According to the exemplary embodiments, a CQF processing block may store a packet in a queue myQ currently in charge of the reception and then set the queuing state parameter internal_enq_state of the enqueue process for a flow to the state enq_myQ of the packet stored in the queue currently performing the reception, the cycle parameter rx_cycle included in the received packet for the flow to a cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation for the previous packet for each flow at the reception node is the same as the cycle parameter internal_cycle for currently performing the CQF operation, and the cycle parameter prev_rx_cycle included in the previously received packet for each flow at the reception node is the same as the cycle parameter rx_cycle included in the currently received packet.

According to the exemplary embodiments, the CQF processing block may store a packet in a queue mateQ currently in charge of transmission, set a hold bit to "1" for a flow, and then set the queuing state parameter internal_enq_state of the enqueue process to the state enq_mateQ_hold of the packet stored in the queue currently performing the transmission and the transmission of the corresponding packet is set to be held in the corresponding cycle, the cycle parameter rx_cycle included in the received packet for the flow to the cycle parameter included in the received packet, and a cycle parameter internal_cycle for performing the CQF operation at the reception node for the flow to the cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation on the previous packet for each flow at the reception node is the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to the exemplary embodiments, the CQF processing block may store a packet in a queue mateQ currently in charge of transmission, set a hold bit to "0" for a flow, and then set a queuing state parameter internal_enq_state of the enqueue process to the state enq_mateQ of the packet stored in the queue currently performing the transmission, the cycle parameter rx_cycle included in the received packet for the flow to the cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation on the previous packet for each flow at the reception node is not the same as the cycle parameter internal_cycle for performing the current CQF operation, and the cycle parameter prev_rx_cycle included in the previously received packet for each flow at the reception node is the same as the cycle parameter rx_cycle included in the currently received packet.

According to the exemplary embodiments, the CQF processing block may store a packet in a queue myQ currently in charge of reception and then set the queuing state parameter internal_enq_state of the enqueue process for a flow to the state enq_myQ of the packet stored in the queue currently performing the reception, the cycle parameter rx_cycle included in the received packet for the flow to the cycle parameter included in the received packet, and the cycle parameter internal_cycle for performing the CQF operation at the reception node for the flow to a cycle parameter for performing the current CQF operation in a case where the queuing state parameter prev_internal_enq_state of the enqueue process for the previous packet for each flow at the reception node indicates the state enq_myQ of the packet stored in the queue currently performing the reception, the cycle parameter prev_internal_cycle for performing the CQF operation for the previous packet for each flow at the reception node is not the same as the cycle parameter internal_cycle for performing the current CQF operation, and the cycle parameter prev_rx_cycle included in the previously received packet for each flow at the reception node is not the same as the cycle parameter rx_cycle included in the currently received packet.

According to various exemplary embodiments of the present disclosure, there is provided an apparatus for enqueue packet processing in a communication system, the apparatus including: an input port; and a cyclic queuing and forwarding (CQF) processing block operably connected to the input port, wherein the CQF processing block may extract cycle information of a received packet from the received packet, identify at least one of whether a queuing state parameter prev_internal_enq_state of an enqueue process for a previous packet for each flow at a reception node indicates a state enq_myQ of the received packet stored in a queue currently performing reception, whether the queuing state parameter prev_internal_enq_state of the enqueue process for the previous packet for each flow indicates a state enq_mateQ of the received packet stored in a queue currently performing transmission, or whether the queuing state parameter prev_internal_enq_state of the enqueue process for the previous packet for each flow indicates a state enq_mateQ_hold of which the received packet is stored in the queue currently performing the transmission and the transmission of the corresponding packet is set to be held in a corresponding cycle, identify whether a cycle parameter prev_internal_cycle for performing a CQF operation for the previous packet for each flow in the reception node is the same as a cycle parameter internal_cycle for performing the current CQF operation, identify whether a cycle parameter prev_rx_cycle included in the previously received packet for each flow in the reception node is the same as a cycle parameter rx_cycle included in a currently received packet, and store (enqueue) the received packet on the basis of the identifying processes and storing information about the received packet in an enqueue state table for each flow.

According to various exemplary embodiments of the present disclosure, there is provided a method of operating dequeue packet processing in a communication system, the method including: a process of identifying a state of a transmission queue and whether a packet is stored in the transmission queue or not, a process of identifying a signal for distinguishing a cycle new_internal_cycle during a CQF operation is performed on a new packet, a process of identifying a signal ignore_hold set to ignore a signal hold set to hold outputting a specific packet, a process of identifying the signal hold set to hold the outputting of the specific packet, the signal being stored for each packet, a process of setting the signal ignore_hold so as to ignore the signal hold set to hold the outputting of the specific packet, and a process of outputting (dequeuing) the packet on the basis of the identifying processes to set a cycle parameter internal_cycle for performing the CQF operation for the packet for each output packet.

According to various exemplary embodiments of the present disclosure, there is provided an apparatus for dequeue packet processing in a communication system, including: an input port; and a cyclic queuing and forwarding (CQF) processing block operably connected to the input port, wherein the CQF processing block may identify a state of a transmission queue and whether a packet is stored in the transmission queue or not, identify a signal for distinguishing a cycle new_internal_cycle during a CQF operation is performed on a new packet, identify a signal ignore_hold set to ignore a signal hold set to hold outputting a specific packet, identify the signal hold set to hold the outputting of the specific packet, the signal being stored for each packet, set the signal ignore_hold so as to ignore the signal hold set to hold the outputting of the specific packet, and output (dequeue) the packet on the basis of the identifying processes to set a cycle parameter internal_cycle for performing the CQF operation for the packet for each output packet.

The methods according to the exemplary embodiments described in the claims or specification of the present disclosure may be implemented in the form of hardware, software, or a combination of hardware and software.

When implemented in software, a computer readable storage medium for storing one or more programs (i.e., software modules) may be provided. One or more programs stored in the computer-readable storage medium are configured for execution by one or more processors in an electronic device. One or more programs include instructions that cause the electronic device to execute the methods according to the exemplary embodiments described in the claims or specification of the present disclosure.

Such programs (i.e., software modules, software) may be stored in a random access memory, a non-volatile memory including a flash memory, a read only memory (ROM), an electrically erasable programmable read only memory (EEPROM), a magnetic disc storage device, a compact disc-ROM (CD-ROM), a digital versatile discs (DVDs) or other forms of optical storage devices, or a magnetic cassette. Alternatively, such programs may be stored in a memory composed of a combination of some or all thereof. In addition, a plurality of configuration memories may be included.

In addition, the programs may be stored in an attachable storage device that may be accessed through a communication network such as the Internet, an intranet, a local area network (LAN), a wide area network (WAN), or a storage area network (SAN), or through a communication network composed of a combination thereof. Such a storage device may be connected to a device for performing the exemplary embodiments of the present disclosure through an external port. In addition, a separate storage device on a communication network may be connected to a device for performing the exemplary embodiments of the present disclosure.

In the specific exemplary embodiments of the present disclosure described above, the components included in the disclosure are expressed in singular or plural numbers according to the specific exemplary embodiments presented. However, the singular or plural expressions are selected appropriately for the presented situation for convenience of description, and the present disclosure is not limited to the singular or plural components. Even components expressed in plural may be composed of a single component, or even a component expressed in a singular number may be composed of a plurality of components.

Meanwhile, in the detailed description of the present disclosure, specific exemplary embodiments have been described, but various modifications may be made without departing from the scope of the present disclosure. Therefore, the scope of the present disclosure should not be limited to the exemplary embodiments described above, but should be defined not only by the scope of claims described later, but also by those equivalent to the scope of these claims.

What is claimed is:

1. A method of operating enqueue packet processing in a communication system, the method comprising:
　　a process of extracting cycle information of a received packet from the received packet;
　　a process of identifying at least one of whether a queuing state parameter (prev_internal_enq_state) of an enqueue process for a previous packet for each flow at a reception node indicates a state (enq_myQ) of the received packet stored in a queue currently performing reception, whether the queuing state parameter (prev_internal_enq_state) of the enqueue process for the previous packet for each flow indicates a state (enq_mateQ) of the received packet stored in a queue currently performing transmission, or whether the queuing state parameter (prev_internal_enq_state) of the enqueue process for the previous packet for each flow indicates a state (enq_mateQ_hold) of which the received packet is stored in the queue currently performing the transmission and the transmission of the received packet is set to be held in a cycle of the transmission queue;
a process of identifying whether a cycle parameter (prev_internal_cycle) for performing a cyclic queuing and forwarding (CQF) operation for the previous packet for each flow in the reception node is the same as a cycle parameter (internal_cycle) for performing the current CQF operation;
a process of identifying whether a cycle parameter (prev_rx_cycle) comprised in the previously received packet for each flow in the reception node is the same as a cycle parameter (rx_cycle) comprised in a currently received packet; and
a process of storing (enqueuing) the received packet on the basis of results of the identifying of the queuing state parameter, identifying of the cycle parameter for the CQF operation, and identifying of the cycle parameter comprised in the packet, and storing information about the received packet in an enqueue state table for each flow.

2. The method of claim 1, further comprising:
a process of storing a packet in a queue (myQ) currently in charge of the reception and then setting a queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation for the previous packet for each flow at the reception node is the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

3. The method of claim 1, further comprising:
a process of storing a packet in a queue (mateQ) currently in charge of transmission, setting a hold bit to "1" for a flow, and then setting the queuing state parameter (internal_enq_state) of the enqueue process to the state (enq_mateQ_hold) of the packet stored in the queue currently performing the transmission and the transmission of the received packet is set to be held in the cycle of the transmission queue, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation on the previous packet for each flow at the reception node is the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

4. The method of claim 1, further comprising:
a process of storing a packet in a queue (mateQ) currently in charge of transmission, setting a hold bit to "0" for a flow, and then setting a queuing state parameter (internal_enq_state) of the enqueue process to the state (enq_mateQ) of the packet stored in the queue currently performing the transmission, a cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation on the previous packet for each flow at the reception node is not the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

5. The method of claim 1, further comprising:
a process of storing a packet in a queue (myQ) currently in charge of reception and then setting a queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation for the previous packet for each flow at the reception node is not the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

6. The method of claim 1, further comprising:
a process of storing a packet in a queue (mateQ) currently in charge of transmission, setting a hold bit to "0" for a flow, and then setting a queuing state parameter (internal_enq_state) of the enqueue process to the state (enq_mateQ) of the packet stored in the queue currently performing the transmission, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node indicates the state (enq_mateQ) of the packet stored in the queue currently performing transmission, the cycle parameter (prev_internal_cycle) for performing the CQF operation for the previous packet for each flow at the reception node is the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

7. The method of claim 1, further comprising:
a process of storing a packet in a queue (myQ) currently in charge of reception, and then setting a queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node is not the state (enq_myQ) of the packet stored in the queue currently performing the reception, the queuing state parameter (prev_internal_enq_state) of the enqueue process for the previous packet for each flow at the reception node is the state (enq_mateQ) of the packet stored in the queue currently performing transmission, the cycle parameter (prev_internal_cycle) for performing the CQF operation on the previous packet for each flow at the reception node is the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

8. The method of claim 1, further comprising:
a process of storing a packet in a queue (myQ) currently in charge of reception, and then setting a queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node indicates the state (enq_mateQ) of the packet stored in the queue currently performing transmission, and the cycle parameter (prev_internal_cycle) for performing the CQF operation for the previous packet for each flow at the reception node is not the same as the cycle parameter (internal_cycle) for performing the current CQF operation.

9. The method of claim 1, further comprising:
a process of storing a packet in a queue (mateQ) currently in charge of transmission, setting a hold bit to "1" for a flow, and then setting a queuing state parameter (internal_enq_state) of the enqueue process to the state (enq_mateQ_hold) of which the packet is stored in the queue currently performing the transmission and the transmission of the received packet is set to be held in the cycle of the transmission queue, the cycle parameter (rx_cycle) comprised in the received packet for the flow to a cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node does not indicate the state (enq_mateQ) of the packet stored in the queue currently performing the transmission, the queuing state parameter (prev_internal_enq_state) of the enqueue process for the previous packet for each flow at the reception node indicates the state (enq_mateQ_hold) of which the packet is stored in the queue currently performing the transmission and the hold bit is set to "1", the cycle parameter (prev_internal_cycle) for performing the CQF operation for the previous packet for each flow at the reception node is the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

10. The method of claim 1, further comprising:
a process of storing a packet in the queue (myQ) currently in charge of reception, and then setting a queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node does not indicate the state (enq_mateQ) of the packet stored in the queue currently performing transmission, the queuing state parameter (prev_internal_enq_state) of the enqueue process for the previous packet for each flow at the reception node indicates the state (enq_mateQ_hold) of which the packet is stored in the queue currently performing the transmission and a hold bit is set to "1", the cycle parameter (prev_internal_cycle) for performing the CQF operation on the previous packet for each flow at the reception node is the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

11. The method of claim 1, further comprising:
a process of storing a packet in a queue (myQ) currently in charge of reception, and then setting a queuing state parameter (internal_enq_state) of the enqueue process for a flow to the state (enq_myQ) of the packet stored in the queue currently performing reception, the cycle parameter (rx_cycle) comprised in the received packet for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node does not indicate the state (enq_mateQ) of the packet stored in the queue currently performing transmission, the queuing state parameter (prev_internal_enq_state) of the enqueue process for the previous packet for each flow at the reception node indicates the state (enq_mateQ_hold) of which the packet is stored in the queue currently performing the transmission and a hold bit is set to "1", the cycle parameter (prev_internal_cycle) for performing the CQF operation on the previous packet for each flow at the reception node is not the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

12. The method of claim 1, further comprising:
a process of storing a packet in a queue (mateQ) currently in charge of transmission, setting a hold bit to "1" for a flow, and then setting a queuing state parameter (internal_enq_state) of the enqueue process to the state (enq_mateQ_hold) of which the packet is stored in the queue currently performing the transmission and the hold bit is set to "1", the cycle parameter (rx_cycle) comprised in the packet received for the flow to a cycle parameter comprised in the received packet, and a cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node does not indicate the state (enq_mateQ) of the packet stored in the queue currently performing transmission, the queuing state parameter (prev_internal_enq_state) of the enqueue process for the previous packet for each flow at the reception node indicates the state (enq_mateQ_hold) of which the packet is stored in the queue currently performing the transmission and the hold is set to "1", the cycle parameter (prev_internal_cycle) for performing the CQF operation on the previous packet for each flow at the reception node is not the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

13. The method of claim 1, further comprising:
a process of storing a packet in a queue (myQ) currently in charge of reception, and then setting a queuing state parameter (internal_enq_state) of the enqueue process for a flow to the state (enq_myQ), the cycle parameter (rx_cycle) comprised in the received packet for the flow to a cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node does not indicate the state (enq_myQ) of the packet stored in the queue currently performing the reception, the queuing state parameter (prev_internal_enq_state) of the enqueue process for the previous packet for each flow at the reception node does not indicate the state (enq_mateQ) of the packet stored in the queue currently performing transmission, and the queuing state parameter (prev_internal_enq_state) of the enqueue process for the previous packet for each flow at the reception node does not indicate the state (enq_mateQ_hold) of which the packet is stored in the queue currently performing the transmission and a hold bit is set to "1".

14. An apparatus for enqueue packet processing in a communication system, the apparatus comprising:
an input port; and
a cyclic queuing and forwarding (CQF) processing block operably connected to the input port,
wherein the CQF processing block extracts cycle information of a received packet from the received packet, identifies at least one of whether a queuing state parameter (prev_internal_enq_state) of an enqueue process for a previous packet for each flow at a reception node indicates a state (enq_myQ) of the received packet stored in a queue currently performing reception, whether the queuing state parameter (prev_internal_enq_state) of the enqueue process for the previous packet for each flow indicates a state (enq_mateQ) of the received packet stored in a queue currently performing transmission, or whether the queuing state parameter (prev_internal_enq_state) of the enqueue process for the previous packet for each flow indicates a state (enq_mateQ_hold) of which the received packet is stored in the queue currently performing the transmission and the transmission of the received packet is set to be held in a cycle of the transmission queue, identifies whether a cycle parameter (prev_internal_cycle) for performing the CQF operation for the previous packet for each flow in the reception node is the same as a cycle parameter (internal_cycle) for performing the current CQF operation, identifies whether a cycle parameter (prev_rx_cycle) comprised in the previously received packet for each flow in the reception node is the same as a cycle parameter (rx_cycle) comprised in a currently received packet, and stores (enqueues) the received packet on the basis of results of the identifying of the queuing state parameter, identifying of the cycle parameter for the CQF operation, and identifying of the cycle parameter comprised in the packet, and storing information about the received packet in an enqueue state table for each flow.

15. The apparatus of claim 14, wherein the CQF processing block stores a packet in a queue (myQ) currently in charge of the reception and then sets the queuing state parameter (internal_enq_state) of the enqueue process for a flow to the state (enq_myQ) of the packet stored in the queue currently performing the reception, the cycle parameter (rx_cycle) comprised in the received packet for the flow to a cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation for the previous packet for each flow at the reception node is the same as the cycle parameter (internal_cycle) for currently performing the CQF operation, and the cycle parameter (prev_rx_cycle) comprised in the previously received packet for each flow at the reception node is the same as the cycle parameter (rx_cycle) comprised in the currently received packet.

16. The apparatus of claim 14, wherein the CQF processing block stores a packet in a queue (mateQ) currently in charge of transmission, sets a hold bit to "1" for a flow, and then sets the queuing state parameter internal_enq_state of the enqueue process to the state (enq_mateQ hold) of the packet stored in the queue currently performing the transmission and the transmission of the received packet is set to be held in the cycle of the transmission queue, the cycle parameter (rx_cycle) comprised in the received packet for the flow to the cycle parameter comprised in the received packet, and a cycle parameter (internal_cycle) for performing the CQF operation at the reception node for the flow to the cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation on the previous packet for each flow at the reception node is the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

17. The apparatus of claim 14, wherein the CQF processing block stores a packet in a queue (mateQ) currently in charge of transmission, sets a hold bit to "0" for a flow, and then sets a queuing state parameter (internal_enq_state) of the enqueue process to the state (enq_mateQ) of the packet stored in the queue currently performing the transmission, the cycle parameter (rx_cycle) comprised in the received packet for the flow to the cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation on the previous packet for each flow at the reception node is not the same as the cycle parameter (internal_cycle) for performing the current CQF operation, and the cycle parameter (prev_rx_cycle) comprised in the previously received packet for each flow at the reception node is the same as the cycle parameter (rx_cycle) comprised in the currently received packet.

18. The apparatus of claim 14, wherein the CQF processing block stores a packet in a queue (myQ) currently in charge of reception and then sets the queuing state parameter (internal_enq_state) of the enqueue process for a flow to the state (enq_myQ), the cycle parameter (rx_cycle) comprised in the received packet for the flow to the cycle parameter comprised in the received packet, and the cycle parameter (internal_cycle) for performing the CQF operation at the reception node for the flow to a cycle parameter for performing the current CQF operation in a case where the queuing state parameter (prev_internal_enq_state) of the enqueue process for the previous packet for each flow at the reception node indicates the state (enq_myQ) of the packet stored in the queue currently performing the reception, the cycle parameter (prev_internal_cycle) for performing the CQF operation for the previous packet for each flow at the reception node is not the same as the cycle parameter (internal_cycle) for performing the current CQF operation, and the cycle parameter (prev_rx_cycle) comprised in the previously received packet for each flow at the reception node is not the same as the cycle parameter (rx_cycle) comprised in the currently received packet.

* * * * *